United States Patent [19]
Kelada

[11] Patent Number: 6,099,735
[45] Date of Patent: Aug. 8, 2000

[54] COUNTER TOP REVERSE OSMOSIS WATER PURIFICATION SYSTEM

[76] Inventor: Maher I. Kelada, P.O. Box 2247, Pearland, Tex. 77581

[21] Appl. No.: 09/090,496

[22] Filed: Jun. 4, 1998

[51] Int. Cl.[7] .............................. B01D 61/00; B01D 63/00
[52] U.S. Cl. .................. 210/652; 210/257.2; 210/195.1; 210/134; 210/137; 210/258; 210/660; 210/85; 210/97
[58] Field of Search .............................. 210/257.2, 195.2, 210/652, 660, 440, 85, 86, 97, 195.1, 134, 137, 258

[56] References Cited

U.S. PATENT DOCUMENTS

| | | |
|---|---|---|
| 3,716,143 | 2/1973 | Clark . |
| 3,849,305 | 11/1974 | Manjikian . |
| 4,877,521 | 10/1989 | Petrucci et al. .......................... 210/440 |
| 5,045,197 | 9/1991 | Burrows . |
| 5,078,876 | 1/1992 | Whittier et al. . |
| 5,096,574 | 3/1992 | Birdsong et al. . |
| 5,160,608 | 11/1992 | Norton . |
| 5,215,657 | 6/1993 | Goldfield et al. ................... 210/321.64 |
| 5,221,473 | 6/1993 | Burrows . |
| 5,244,579 | 9/1993 | Horner et al. ........................... 210/652 |
| 5,290,442 | 3/1994 | Clack .................................... 210/257.1 |
| 5,296,148 | 3/1994 | Colangelo et al. ...................... 210/642 |
| 5,358,635 | 10/1994 | Frank et al. . |
| 5,445,729 | 8/1995 | Monroe et al. ....................... 210/257.2 |
| 5,597,487 | 1/1997 | Vogel et al. ............................. 210/652 |
| 5,632,892 | 5/1997 | Klein .................................... 210/257.2 |
| 5,658,457 | 8/1997 | Schoenmeyr ............................. 210/97 |
| 5,827,428 | 10/1998 | Chang .................................. 210/257.2 |
| 5,879,558 | 3/1999 | Monroe et al. .......................... 210/652 |
| 5,911,884 | 6/1999 | Boulter .................................... 210/739 |
| 5,928,503 | 7/1999 | Shang-Chun .............................. 210/86 |

Primary Examiner—Ana Fortuna
Attorney, Agent, or Firm—Russell J. Egan

[57] ABSTRACT

A counter top reverse osmosis water purification system, suitable for home use, is connected to a water supply and contains a closed fluid treatment circuit extending to a water outlet. The closed fluid circuit flows through a plurality of replaceable water treatment modules mounted on a flowboard and each having a specific water treatment function, such as the removal of a particular material from the water by the use of reverse osmosis, filtration, carbon adsorption, ion exchange or the addition of a chemical to balance the desired water conditions. Preferably the circuit also includes traversing a radiation device, for example an ultraviolet light, for the purpose of sanitizing the water.

47 Claims, 17 Drawing Sheets

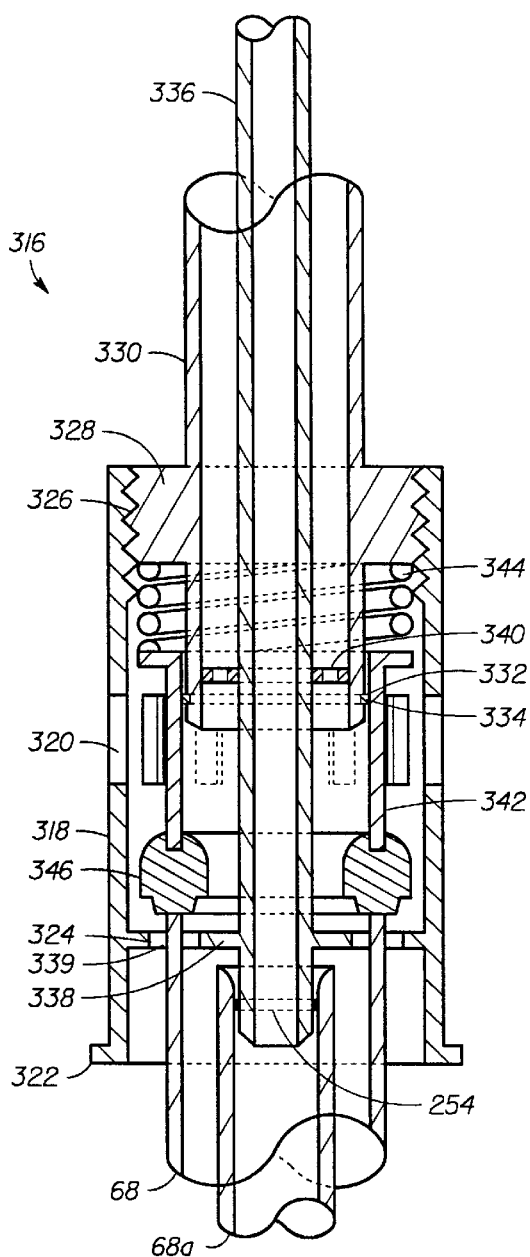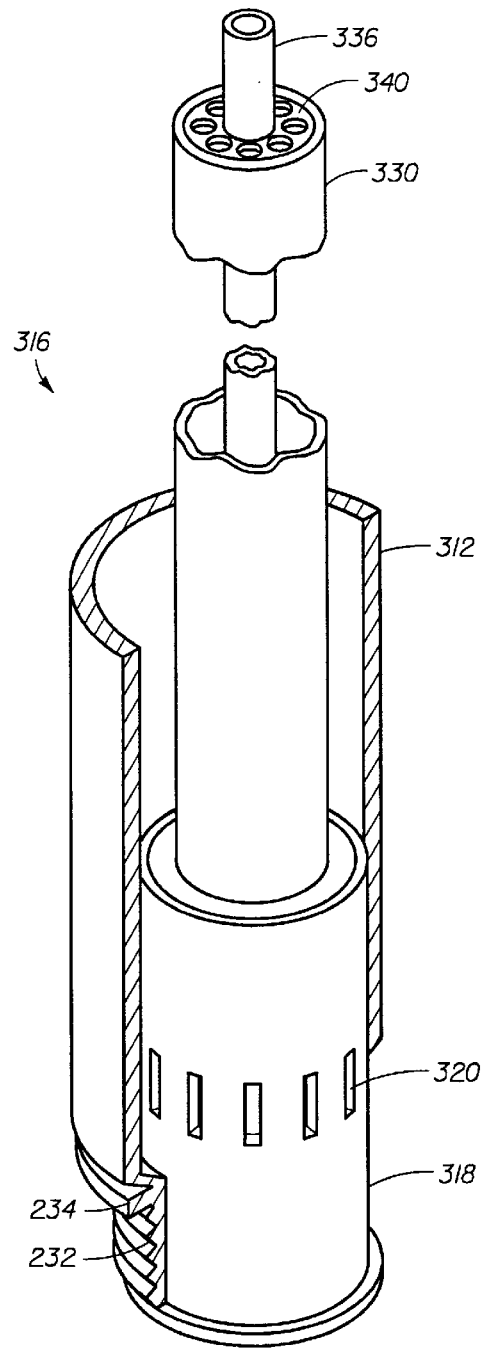
FIG. 10
FIG. 11

COUNTER TOP REVERSE OSMOSIS WATER PURIFICATION SYSTEM

BACKGROUND OF THE INVENTION

1. The Field of the Invention

The present invention pertains to methods and systems using reverse osmosis for water purification and, in particular, to domestic units which are readily adaptable to treat local water in accordance with any existing long term or varying temporary condition to produce water of high purity and to a flowboard for mounting fluid purification elements and controlling flow distribution in the system.

2. The Prior Art

The availability of quality potable water is becoming an increasing national and world concern. There are many areas where local water has been subject to mismanagement and the quality thereof has gone down dramatically to the point that it may be dangerous for human consumption. There also are areas, such as west Texas, where natural fluorides occur at such high levels that the water will adversely affect the teeth of young children leaving them with discolored teeth for life. There are still other areas, such as the Dakotas, where the water naturally contains high levels of sulfides making the water practically undrinkable to many. Further there are periodic local and/or regional occurrences, such as the weather related natural disasters of flooding and hurricanes, when local water supplies may become contaminated and at least temporarily unsafe for drinking. Theretofore, the accepted solution to these problems has been the importation of bottled water. This often is at great cost and bottled water may not always be available, such as in times of natural disasters when both water supplies and modes of transportation are damaged. Further, there is no assurance that any imported bottled water will have acceptable purity as there currently are no federal, state, or local standards in force which would have to be met by the bottlers.

Impurities in natural raw waters (surface or well water) occur in four basic different forms, namely non-ionic and undissolved impurities; ionic and dissolved impurities; gaseous impurities and biological impurities. Each of these impurities requires separate treatment techniques and equipment for their removal.

Non-ionic and undissolved impurities include, but are not limited to, turbidity, silt, mud, suspended solids, organic matter, bacteria, oil, colloidal matter and colloidal silica. A common technique to remove such impurities is filtration using a wide variety of coarse and fine filter media. Some other techniques include coagulation, sedimentation and adsorption on activated charcoal or carbon. In raw water treatment, it is customary to use a coarse filter (sand and anthracite) followed by a fine filter (cartridge), and then to treat the water with activated carbon to remove organic matter. In cases using pretreated water, such as municipal water supply, the first filtration with course sand is generally unnecessary.

Ionic and dissolved impurities include a wide variety of salts dissolved in water and dissociated to form positive ions, called cations, and negative ions, called anions. The major cations in natural raw water are calcium, magnesium, sodium, potassium, ammonium, iron and manganese. The major anions are carbonate, bicarbonate, hydroxide, chloride, sulfate, nitrate, phosphate, and silica. Both of these lists are intended to be representative and should not be considered in any way as all-inclusive. Both the positive ions and the negative ions combine in various fashions to form a large group of compounds that would dictate the treatment process for their removal. For example, calcium and magnesium form carbonates, which, in turn, cause water hardness. Water containing large amounts of carbonates must be softened to prevent fouling and clogging of equipment and other separation media.

Natural waters also include traces of different heavy metals. Several means are used to partially or completely remove such impurities. U.S. Pat. No. 5,190,659 to Wang, is a good example of water conditioning, or partial treatment, for removal of these metals. Complete removal of metal impurities requires other techniques, such as evaporation, membrane separation and ion exchange.

Gaseous impurities include a number of gases that are soluble in water. Some are found naturally in well water, such as carbon dioxide, hydrogen sulfide, and methane. Others are the result of water purification or industrial application and include such gases as ammonia, oxygen and chlorine. In these cases, aeration, oxidation, stripping or an oxidizing catalyst, such as manganese green sand zeolite, is usually a practical means for removing the dissolved gases.

Biological impurities include all types of microorganisms, bacteria, viruses, and pathogen. Several disinfection methods are available for treating this type of impurity including boiling (limited to small volumes), chlorination, ozonation and ultraviolet radiation.

In most cases, all of these four forms of impurities coexist simultaneously and in differing amounts and their relative proportions can vary, even seasonally. No single treatment or technique is adequate for or capable of removing all impurities in one step. Multiple related or interdependent processes are normally required to rid water from such impurities.

Generally these processes must be constantly monitored to assure each form of impurity is being properly treated and removed.

Membrane separation is an economic means for removing dissolved solids from water that contains low concentration of these solids. Development of membranes for water purification is a consequence of a naturally occurring phenomenon called Osmosis. Osmosis is a spontaneous flow of pure water from a weaker to a stronger solution through a semi-permeable membrane, such as live plant cell walls or a synthetic cellulose acetate film. Solvent (water in this case) ceases to flow when the generated differential head (water column height) across the membrane equalizes the force generated by the chemical potential difference (molecular concentration) across this membrane. The net force exerted by the flow of water across the membrane is called osmotic pressure. Reverse osmosis (RO) is a pressure driven membrane operation and in fact is the reverse process of osmosis. Under pressure exceeding the osmotic pressure of the solution, water or solvent permeates through a semi-permeable membrane from a more concentrated stronger solution to a less concentrated solution. Rejection of dissolved solids could reach 98% depending on the applied force and the original concentration of the solution. For example, water containing 500 PPM of dissolved solids could be purified with reverse osmosis to about 10 PPM.

Reverse osmosis (RO) synthetic membrane materials can be formed in shape of hollow fine fibers, tubular, plate and frame or spiral-wound. The spiral-wound membrane is an envelope of two flat films enclosing a flexible porous substrate to facilitate permeate flow and is sealed on three of its edges. The open edge is connected and rolled up onto a perforated permeate tube forming a spiral. These envelopelike membranes are separated from one another with a corrugated or mesh spacer to allow open feed flow. Under pressure, water permeates through the film and collects in the concentric perforated tube while the concentrated solution continues flowing to an outlet opposite to the feed inlet. Most of the reverse osmosis systems for commercial and residential water purification system use the later type of membranes in the form of an elongated cylinder housed in a disposable cartridge. Each cartridge has a feed water inlet at one end and permeate (purified water) and reject (high concentrated brine) outlets at the other end. An example of such a cartridge is described in U.S. Pat. Nos. 3,504,796 and 4,842,736, both to Bray.

Membranes are very susceptible to molecular, biological or sedimentary fouling that can easily reduce their useful life. To maintain longevity of membranes (normally three years), water pretreatment is usually required. This pretreatment includes filtration, organic removal, softening and disinfection. For domestic systems, usually the first two pre-treatment steps are provided. Membranes are highly effective in retaining bacteria and pathogen. In most cases, post-treatment is not required. Unfortunately, biological contamination of water purified with reverse osmosis is common. Most membranes are sensitive to oxidizers, such as chlorine and other similar disinfectant substances. These disinfectants must be removed from water prior to treatment to avoid premature membrane failure. As a result, water enters the membrane with no disinfectant residual that could inhibit microbiological growth on these membranes and further contaminating water during handling and storage.

Furthermore, reverse osmosis membranes are relatively low capacity units. For example, a conventional 12" reverse osmosis cartridge that is normally used for household can only produce between 2–8 gallons per day at municipal water supply pressure. To make up for the slow water production, a storage tank is always provided to collect and store the slow flow of permeate to meet instantaneous demand. For under the counter units, a bladder tank (3–5 gallons) is provided. In these tanks, water is stored in a bladder. The annulus between the bladder and the tank wall is permanently pressurized with air up to 15 psi to make it possible to dispense water on demand. A five-gallon bladder tank is aesthetically unacceptable option for counter-top applications.

The capacity of these membranes is highly dependent on the water supply pressure. An increase in line pressure will proportionally increase the amount of produced water. For this reason, large commercial and industrial systems are provided with booster pumps. Small household systems operate under the hydraulic pressure of the municipal supply line with a minimum pressure of 35 psi. Operating a reverse osmosis under this low pressure and, against back pressure of 15-psi in the storage tank, can significantly reduce the capacity of the membrane.

Household reverse osmosis systems consist of more than one module for water purification. These systems also require adequate means to store purified water. Commonly known systems are bulky and require an experienced technician to install and maintain. Due to their size, they are normally mounted under kitchen sink. Such systems are impractical from an anesthetic standpoint to place on a counter.

Examples of known approaches to water treatment systems and apparatus incorporating reverse osmosis are described in the following patents.

U.S. Pat. No. 5,045,197 to Burrows describes a conventional under sink, reverse osmosis water purification system. It comprises of a unitary wall mounted manifold to mount a reverse osmosis cartridge and associated pre and post filtration elements. The system comprises an under-sink water storage vessel equipped with a bladder U.S. Pat. No. 4,744,895 to Gales et al relates to a counter top reverse osmosis water purifier connected to the end of a household water faucet, using a detachable diverter valve. The purifier comprises a housing that encompasses reverse osmosis element and filtration modules in the lower section of the housing. An atmospheric water reservoir occupies the upper section of the housing. A water conductivity device and battery operated pump are also installed in the housing to for controlling and dispensing purified water. Several pipes and fittings protrude through the atmospheric reservoir making its sanitization difficult. The purifier provides no provisions to prevent stored water contamination, which would place its effectiveness for household water purification into question.

U.S. Pat. No. 5,078,876 to Whittier et al describes a household, concentric multistage potable water purification system. The system is counter top mounted. It consists of a detachable cylindrical vessel mounted on a base and houses one or more replaceable, shell formed concentric purification modules. These modules could include filtration media, reverse osmosis element and an optional Ultraviolet lamp spaced radially in the vessel. Purified water is discharged from the purifier and to be collected by the user (no reservoir is shown). The said patent provides compact multistage, single unit design, but without adequate provisions for water quality measurement and control, handling of exhausted elements that could be biologically contaminated, system sanitization, and adequate means for water storage.

U.S. Pat. No. 5,096,574 to Birdsong et al discloses a counter top reverse osmosis system consisting of a cabinet containing three cavities which respectively receive cartridges housing a sediment filter, reverse osmosis filter and a final stage impurity filter. Permeate from the reverse osmosis is fed to a bladder within a storage tank. Concentrate from the reverse osmosis filter is used within the storage tank as squeeze water for the bladder. Complicated systems for constant delivery of consumer water usage, operating under wide range of pressure and monitor flow are provided. The disclosure does not provide means to sanitize water being stored in the tank bladder.

U.S. Pat. No. 5,358,635 to Frank et al describes a reverse osmosis water processing and storage system. It comprises an external self supported vertical pressure vessel that receives at its open top a bladder forming a variable volume between the bladder and the external tank. A second internal tank is received and secured in the bladder, forming a second variable volume between the second tank and the bladder. A concentric pre-filter and a reverse osmosis membrane assembly is received and secured in the second tank. Raw water enters the second tank and flows through the pre-filter and then through the reverse osmosis membrane. The purified water thereafter flows to the second variable storage where it can be dispensed for usage under the accumulated pressure in the external tank. Due to vessel elevation and flexible piping layout, it is safer to install this system in a confined space such as under a sink.

U.S. Pat. No. 5,445,729 to Monroe et al describes a counter top reverse osmosis system which operates under low back pressure. The unit consists of housing suitable for counter top mounting and encompasses two compartments. The first compartment contains water treatment elements including, pre and post filters, ultraviolet light means, and a reverse osmosis membrane. The second compartment contains bladder type water storage and a pump to withdraw water for dispensing. The system is compact and includes an array of water treatment elements, but seems to undermine maintenance simplicity. Furthermore, the system relies on electrical power to dispense water. Failure of the power source could render the system inoperable.

It is an object of the present invention to provide a method and system for point-of-use, counter top, reverse osmosis water purification. The subject method and system are primarily intended for residential and lower volume commercial markets by improving the aesthetic quality of water and controlling, or substantially eliminating, any and all ionic and/or microbiological contamination naturally occurring in the raw water. Each unit has a flowboard, which can be specially configured for the local water supply with replaceable cartridges for filtration, adsorption, reverse osmosis, ion exchange, and biological disinfection. The flowboard also allows configuration for providing additives to the water during treatment. The unit can be provided with digital instrumentation. Operational safety and ease of maintenance are key features of the present invention.

SUMMARY OF THE PRESENT INVENTION

The present invention is a modular water treatment and purification system suitable for home, office, or laboratory use. The system is connected to a water supply and drain, an electrical supply, and treats the local water in a closed fluid treatment circuit extending from an inlet to an outlet. The closed fluid circuit includes a flowboard upon which plurality of water treatment modules are mounted. Each module is readily replaceable and the flowboard controls the sequential flow of water through the modules. Several independent water conditioning and treatment processes are used within the subject system. Basic operations for most units would include, but not be limited to: sediment and turbidity removal by filtration; organic and gas removal by carbon adsorption; dissolved impurities removal by reverse osmosis, which could be complemented with ion exchange; biological control by ultraviolet light; and water quality preservation by a hygienically designed storage system. Each operating unit can be uniquely configured to accommodate for local water conditions while insuring ease of maintenance, value and performance. Moreover, all residential system embodiments are counter-top mounted and have compact, functional and aesthetically pleasing styling.

The subject system incorporates a uniquely designed mounting base, called a "flowboard". The flowboard contains a plurality of receptacles, each of which receives a respective one of a plurality of single ended cartridges or modules vertically therein. The flowboard also contains concealed pipe means interconnecting the receptacles and provided with linear valve means controlling flow of water through the flowboard.

The basic design mentioned thereafter provides for a counter-top water purification system for residential and light commercial, such as laboratories or offices. The system incorporates reverse osmosis principles and is complimented with a full array of pre and post water treatment means and control devices to meet most water sedimentary, molecular and biological treatment requirements. Yet, the system is compact, efficient, safe to operate, esthetically pleasing and easy to maintain.

This system employs spiral wound reverse osmosis membranes housed in single ended cartridges for ease of mounting on a flowboard. Water inlet and both reject water and permeate water outlets are all concentrically confined within only one port at the bottom of the reverse osmosis cartridge. Therefore, it is an object of this invention to redesign conventional spiral wound membrane cartridges for a three stream single ended cartridge to be mounted on a specially designed three connection mounting assembly.

It is also an object of this invention to maximize the capacity, efficiency and performance of this water purification system. Therefore, purified water is stored against atmospheric pressure without back pressure. The high differential pressure between the supply header and the storage tank enhances membrane capacity and allows the use of a more compact and esthetically acceptable counter top storage vessel, which is integral to the reverse osmosis system.

This invention also provides for pre-treatment and post-treatment of water to insure equipment reliability and water purity. The pre-treatment consists of sediment, organic removal and possibly water softening. The post treatment consists of an optional ion exchanger and a continuously operated ultraviolet disinfection device. Extensive provisions are provided to prevent water contamination during storage by circulating water through the ultraviolet device. Furthermore, it prevents airborne biological contamination at the storage tank vent (breathing) outlet.

It is further an object of this invention to uniquely design all water treatment cartridges and storage tank with single ended connection. These devices are mounted on a uniquely designed flowboard that conceals all connecting piping and fittings.

It is also an object of this invention that replacement of any module or device does not require connecting or disconnecting any pipe or fitting. Therefore, no tools are required to replace water treatment modules or flow control devices. All devices are provided with only one single threaded connection and can be placed or removed from the flowboard by hand. The system requires minimum experience to install or replace its parts.

It is still an additional object of this invention to uniquely design single ended, top mounted pipe-less flow control devices, such as magnetic and direct drive circulation pumps, solenoid valves, check valves, flow meters, variety of water purification cartridges, storage vessels, thermoelectric coolers and hot water heaters. The same unique design can be adapted to complex unit operations, such has catalytic reaction, oxidizing agents, pulsing micro-filtration and others.

It is also an object of this invention to provide an easy to operate and maintain system. Therefore, this invention replaces the large number of conventional block and diverter valves, that are normally used for purging, recycling, and draining such system, with two uniquely designed linear motion valves. A single stroke of each linear valve simultaneously replaces the action of almost any number of conventional valves.

It is yet another object of this invention to provide a safe system to operate and maintain. Electrical wiring is concealed and none is exposed. All electrically operated devices, such as solenoids and pumps, have concentric electrical contact strips of opposite polarity at the top of each of these devices. These contact strips engage spring-tensioned contacts of equivalent size, aligned above each device and mounted within a protective socket integral to the system housing. Wires connecting the power supply to the electrical socket of each device or instrument are shielded in a protected compartment at the top of the system housing. Furthermore, opening the system housing requires that the power cord to the unit be unplugged in order to de-activate the system electrical locks. Upon removing the cover, all power-supplied fixtures attached to the said cover are momentarily isolated from their associated flow devices mounted on the flowboard, rendering these devices safe to inspect and maintain.

It is another object of this invention to provide a system adaptable for specific applications or needs. Two embodiments of this invention are described. The first embodiment is intended for household or office use and is provided with a detachable tank for the purpose of refrigeration or transport. Ion exchange is optional. In this embodiment water is periodically, by means of a timer, or continuously circulated between the tank and the disinfecting unit by means of a pump. Water dispensing is by gravity. This pump could assist in water dispensing, but it is not a requirement for system operation. Since this tank is vertically top mounted, a means to prevent spillage upon detachment is provided. Cooling is not required for the UV disinfection unit, since water is circulated in a container with a large surface area.

The second embodiment (FIG. 22) is intended for commercial application (medical or laboratory) to provide purified water at the point-of-use. In this case, the storage tank is undetectable and located intermediately through the flow path. Mixed bed ion exchange and temperature controlled disinfection units are provided. The ion exchange is located down stream of the storage tank to insure the removal of any dissolved gases that could occur during storage. A single ended, top mounted pump is used to overcome the pressure drop across the ion exchange bed.

In these two embodiments, the air displaced during filling and evacuating the storage tank is vented to the atmosphere. To prevent airborne matter from contaminating the stored water, a silver impregnated carbon bed is placed on the breathing/overflow line.

In other embodiments of this invention, a single ended thermoelectric water cooler and an electric water heater could be provided. Also, medicinal, flavor or other additive cartridges and other flow control and monitoring devices could be incorporated.

The same unique design can be further developed for use in small capacity applications, where complex unit operations are required such as, but not limited to, catalytic reaction, use of oxidizing agents, removal of heavy or precious metals, membrane gas separation, and pulsing micro-filtration. The design could be easily developed for use in analytical laboratories, as an analytical tool, for research and pilot plants instead of glassware, particularly when high-pressure apparatus is required.

BRIEF DESCRIPTION OF THE DRAWINGS

The present invention will now be described, by way of example, with reference to the accompanying drawings, in which;

FIG. 10 is a vertical section through a water tank spill-free insert;

FIG. 11 is a perspective view, partially broken away, of the insert of FIG. 10

DETAILED DESCRIPTION OF AN EMBODIMENT OF THE INVENTION

The present invention concerns a method, apparatus and total system for purifying water and is particularly directed to an apparatus and system which are of such size as to be suitable for domestic counter top use. The embodiment shown in the figures is intended as a counter mounted model readily placed in any domestic environment, such as homes, coffee rooms of offices and the like. All that is required for installation is a connection to local water source, a water drain, and an electrical power source.

Figure 1:
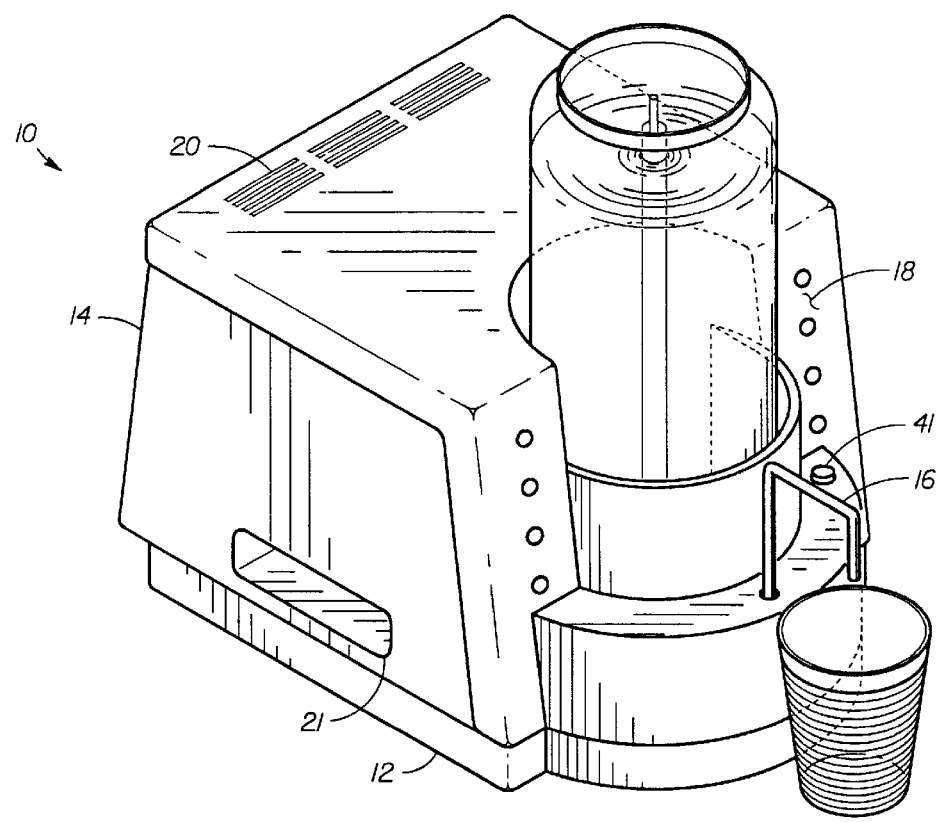
FIG. 1 is a front isometric view of an embodiment of the counter top water-conditioning unit according to the present invention.

Turning now to FIGS. 1 to 3 and 12 to 16, the illustrated embodiment of the subject water purification system 10 has a flowboard 12 forming a support for a plurality of generally bottle shaped cartridges including, but not restricted to, a sediment filter cartridge 24, an activated carbon filter cartridge 26, a reverse osmosis cartridge 28, an ion exchange cartridge 30, a disinfection chamber cartridge 32, and a water storage vessel 34. Also provided on the flowboard are a solenoid actuated inlet flow control valve 22, linear valve assemblies 48, 50, level switch 36, circulating pump 38, a solenoid actuated outlet flow control valve 40, a check valve 42, a vent disinfection cartridge 44, a vent/drain gap cup 46, inlet water port 100, and a drain port 200. A housing cover 14 and a water dispenser 16 of known design are shown in FIG. 1. The cover 14 is of sufficient size to enclose all of the cartridges. The cover preferably also includes a system status display 18, such as a LCD or array of LED's, a water dispensing push button switch 41, hand slot means 21 to carry the purifier, and air vents 20. Not shown in FIGS. 1 to 3 and 12 to 16 are the non-exposed electrical connections, means to secure the cover on the flowboard (including electrical interlocks), and the optional features of water heater means, water cooler means, and water conditioning means for introducing additives (such as fluorides) to the treated water.

Figure 2A:
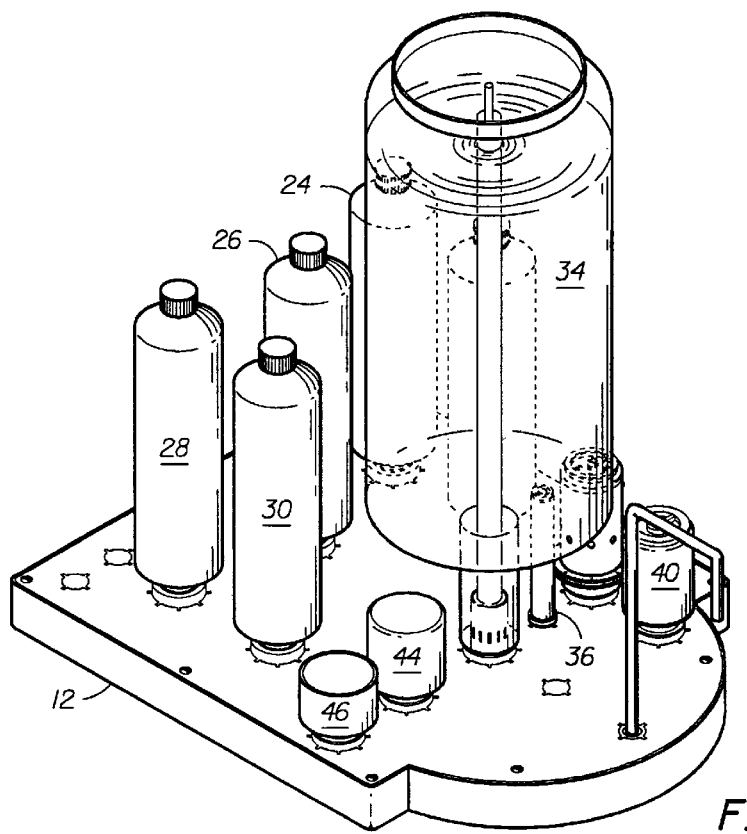
FIG. 2A is a similar front isometric view of the embodiment of the present invention shown in FIG. 1 with the cover removed.
Figure 2B:
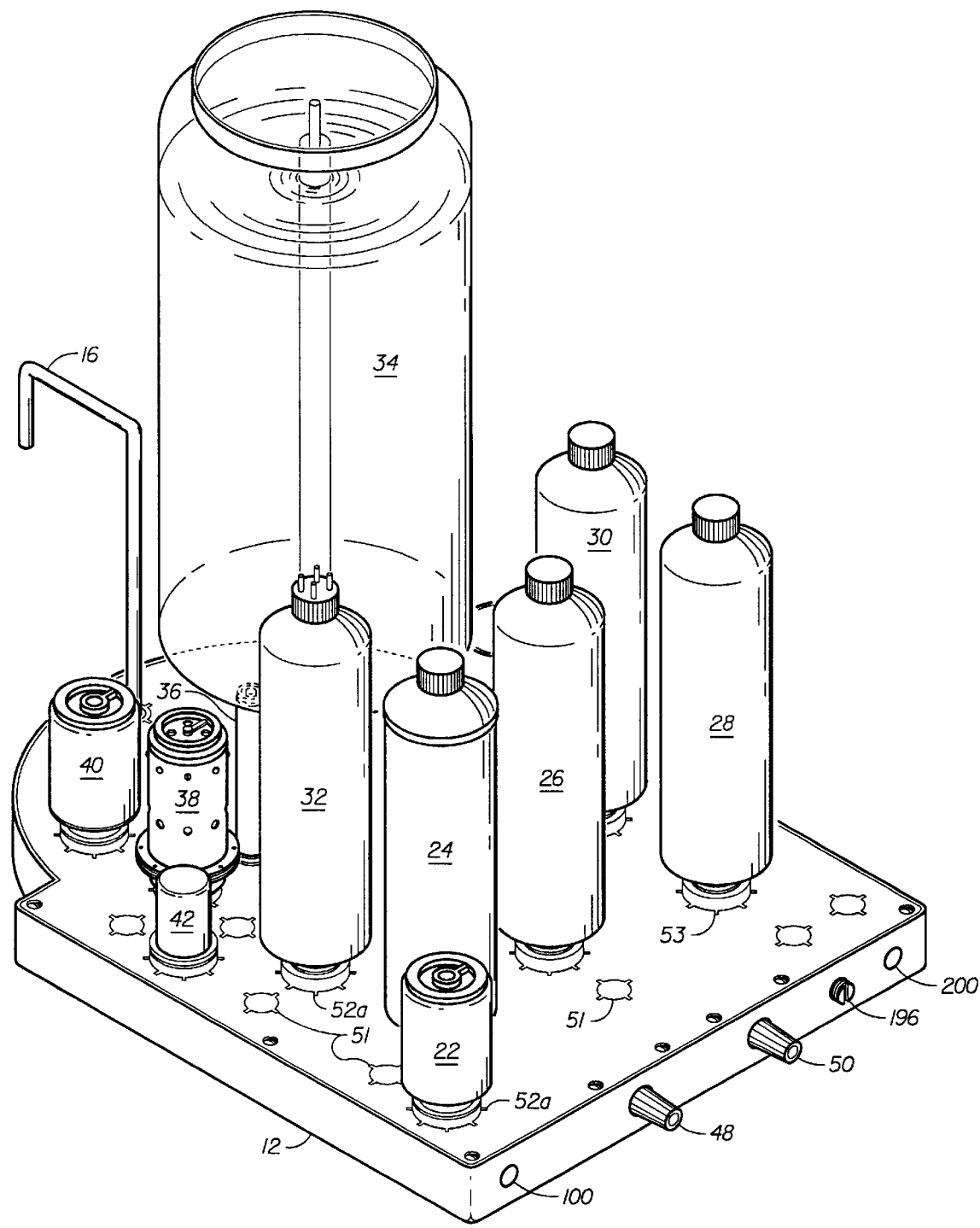
FIG. 2B is a rear isometric view of the embodiment of present invention shown in FIG. 2 with the cover removed.
Figure 3:
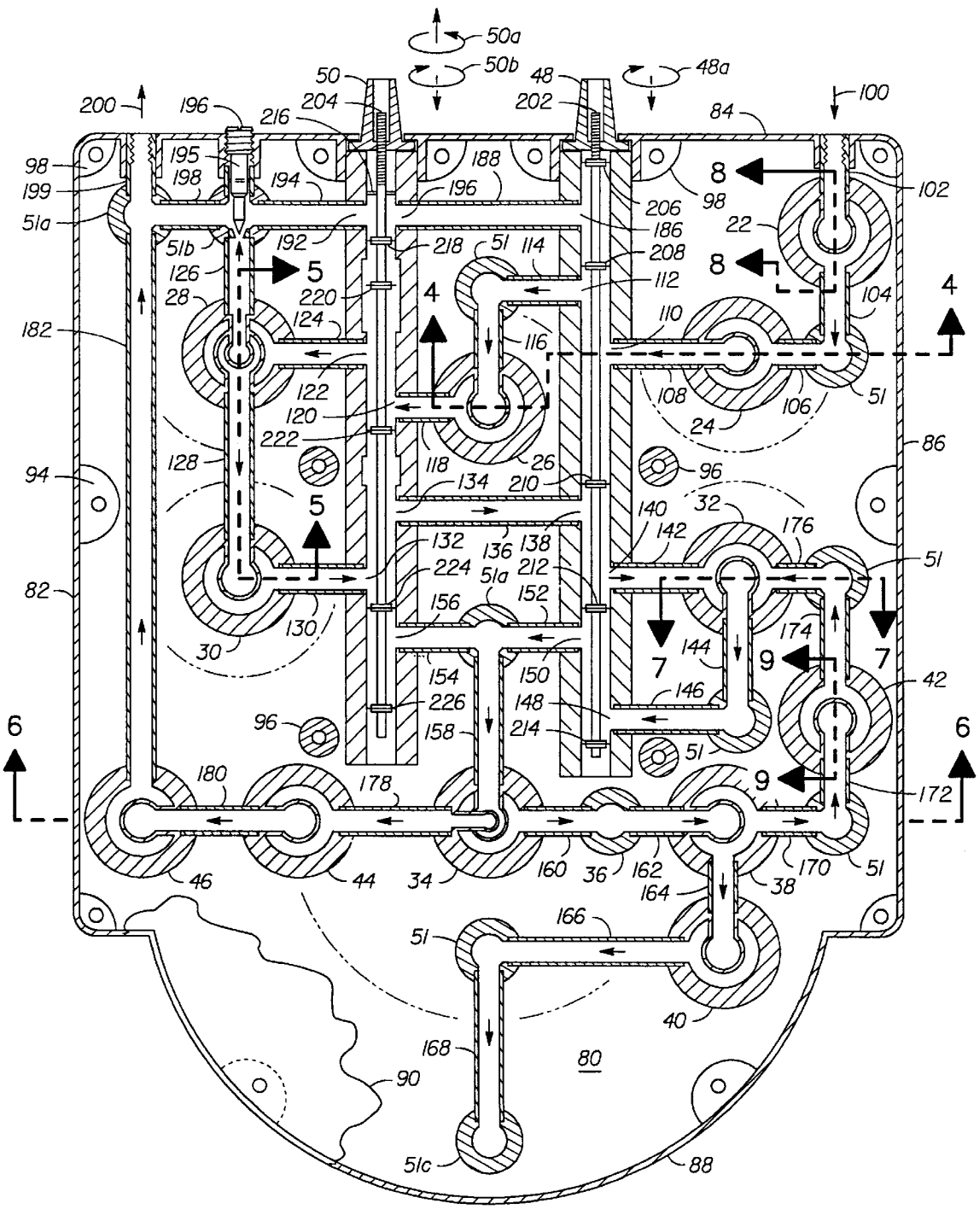
FIG. 3 is a top plan view of the flowboard of the present invention.
Figure 14:
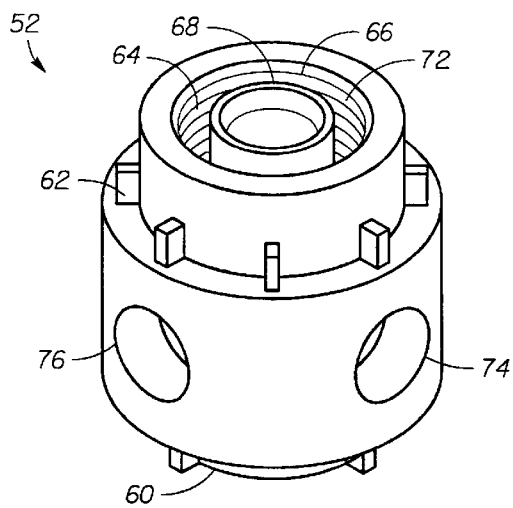
FIG. 14 is an isometric view, similar to FIGS. 12 and 13, of a cartridge mounting assembly for the present invention showing inlet and outlet at 90-degree apart.
Figure 15:
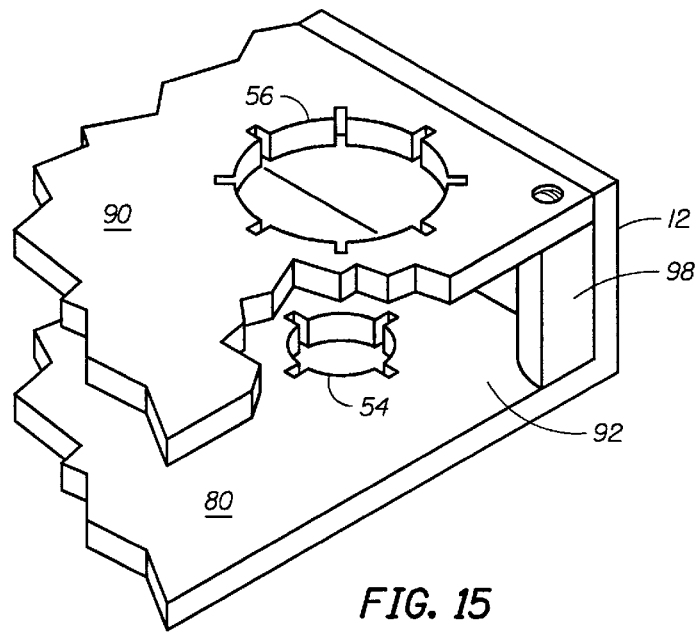
FIG. 15 is a perspective view of a portion of the flowboard of the present invention with one side wall removed to show the interior of the flowboard.

The flowboard 12, as shown in FIGS. 2A, 2B and 3 is preferably a rectangular box-like structure of light weight metal or rigid plastics material preferably having a base 80, integral side walls 82, 84, 86, 88 and a removable top 90 defining a cavity 92 (see FIG. 15) for receiving therein a plurality of flow control devices and cartridge mounting assemblies 51, 52, 53 (see FIGS. 12 to 16). The flowboard 12 also receives conduits for connecting the respective mounting assemblies for the flow control devices 22, 36, 38, 40 and 42 and cartridges 24, 26, 28, 30, 32, 34, 44, and 46 to each other and to the linear motion valves 48 and 50. These two linear valves 48 and 50 control the direction of flow of water through the flowboard, in accordance with the desired operational mode. The base 80 of the flowboard 12, as best seen in FIG. 15, has a plurality of holes or recesses 54 and the cover 90 has a like number of profiled apertures 56, each aperture 56 aligned with a respective hole 54 to simplify non-rotatable assembly of mounting blocks 52 and 53 in the flowboard 12. Similar apertures of adequate size are also provided for pipe fitting and branches 51, 51a, 51b, and 51c.

Figure 4:
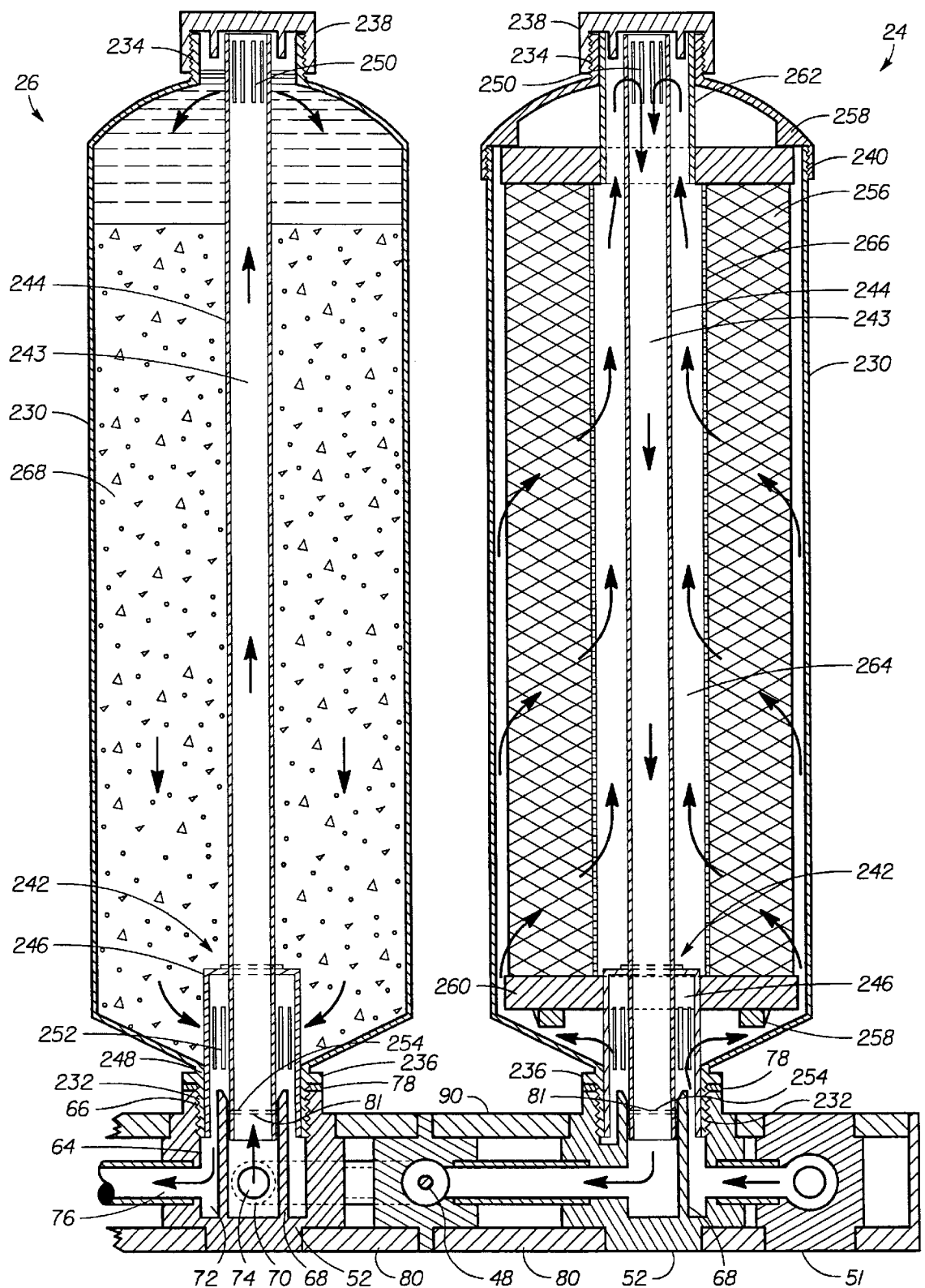
FIG. 4 is a vertical section through a portion of the flowboard of the present invention, taken along line 4—4 of FIG. 3, showing the mounting of a sediment filter and an activated charcoal cartridge.
Figure 5:
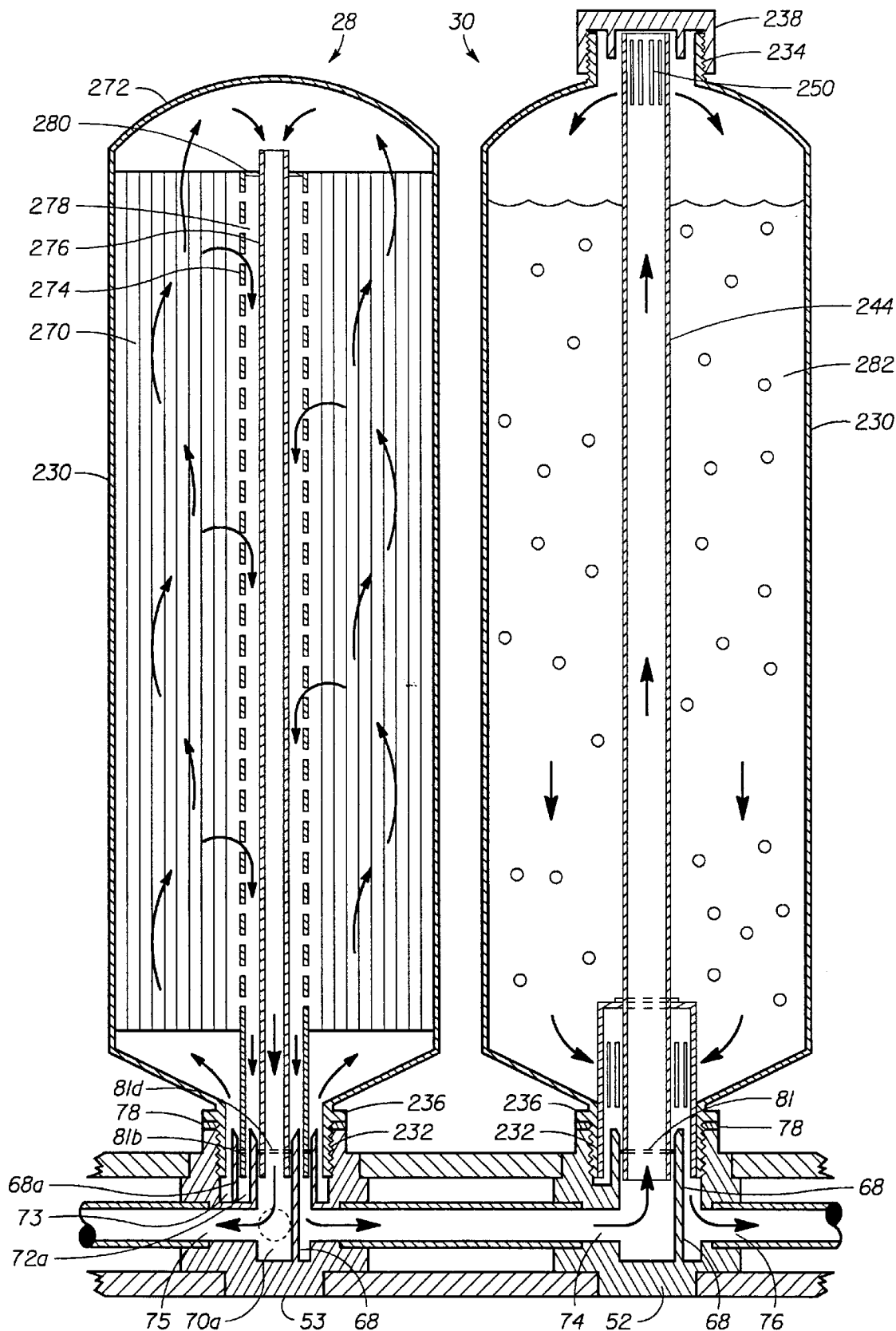
FIG. 5 is a vertical section through another portion of the flowboard of the present invention, taken along line 5—5 of FIG. 3, showing the mounting of the reverse osmosis cartridge and the ion exchange cartridge.
Figure 6:
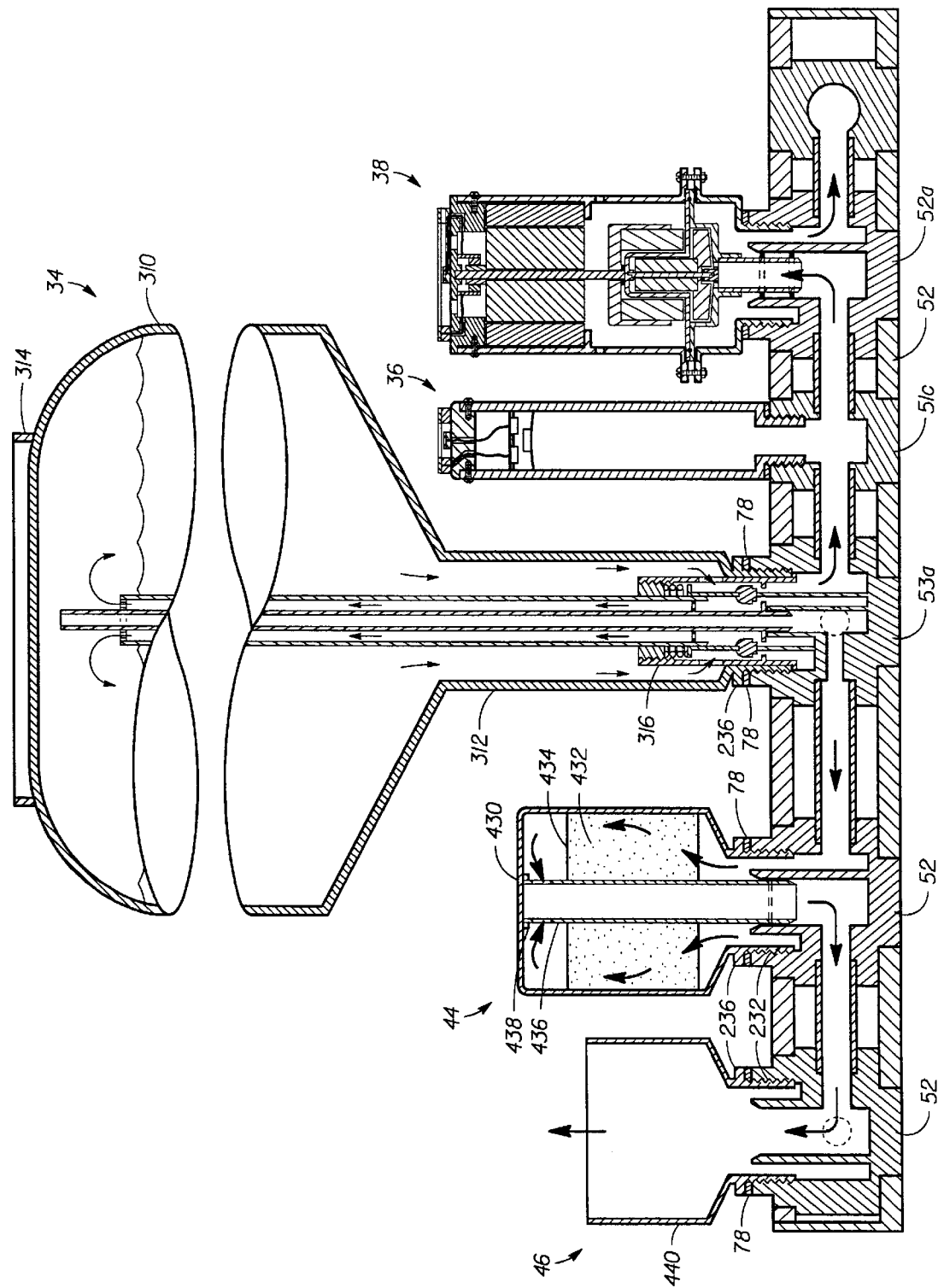
FIG. 6 is a vertical section through another portion of the flowboard of the present invention, taken along line 6—6 of FIG. 3, showing, from left to right, the vent/drain gap cup of the water storage vessel, vent disinfection cartridge, the water storage vessel (bottle), the high water level switch (pressure related), and the magnetic driven circulation pump.
Figure 7:
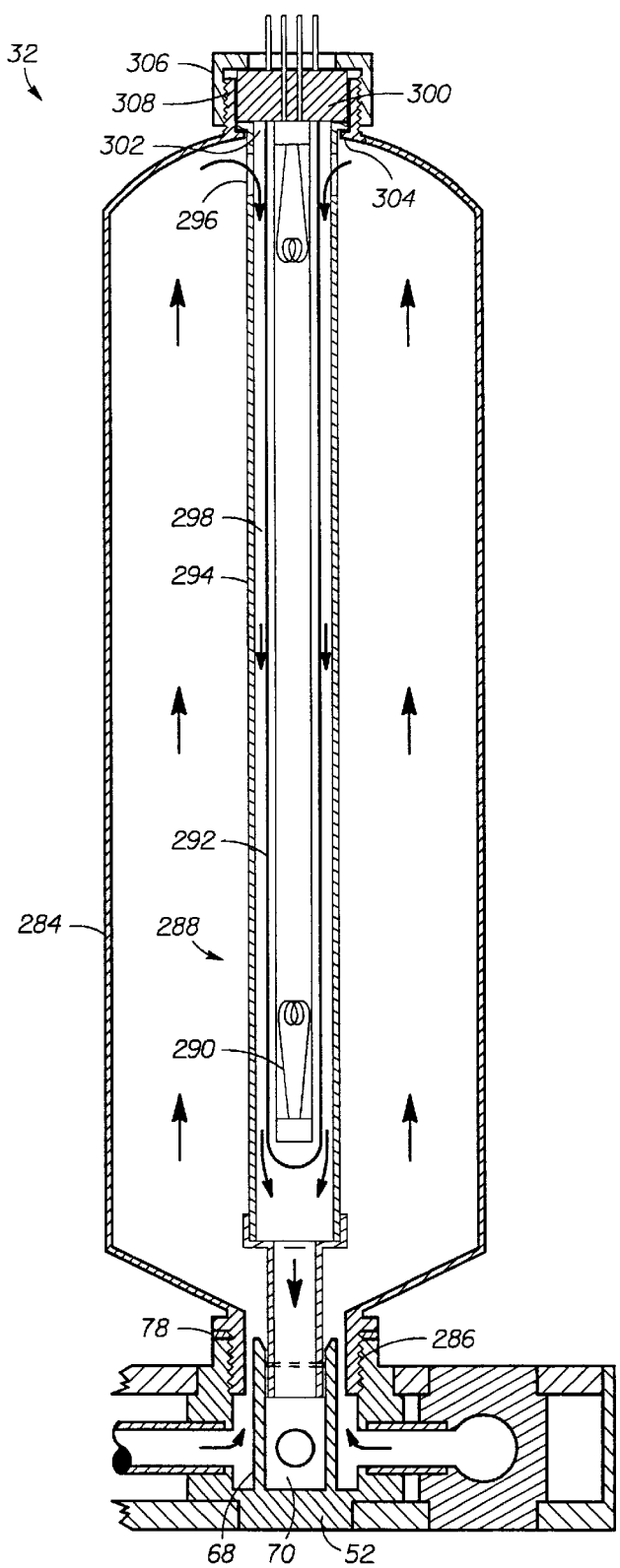
FIG. 7 is a vertical section through another portion of the flowboard of the present invention, taken along line 7—7 of FIG. 3, showing the mounting of the ultraviolet cartridge.
Figure 12:
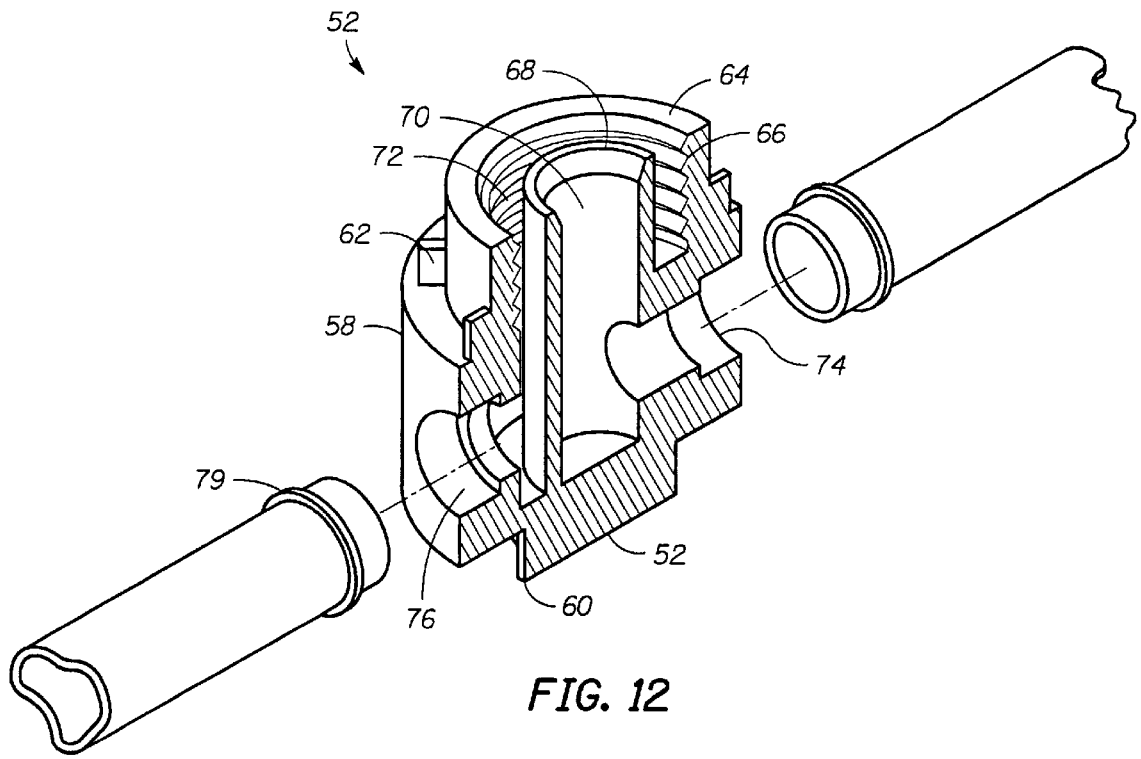
FIG. 12 is a perspective sectional view of a two-way cartridge mounting assembly of the present invention used for all media cartridges and flow control devices.
Figure 13:
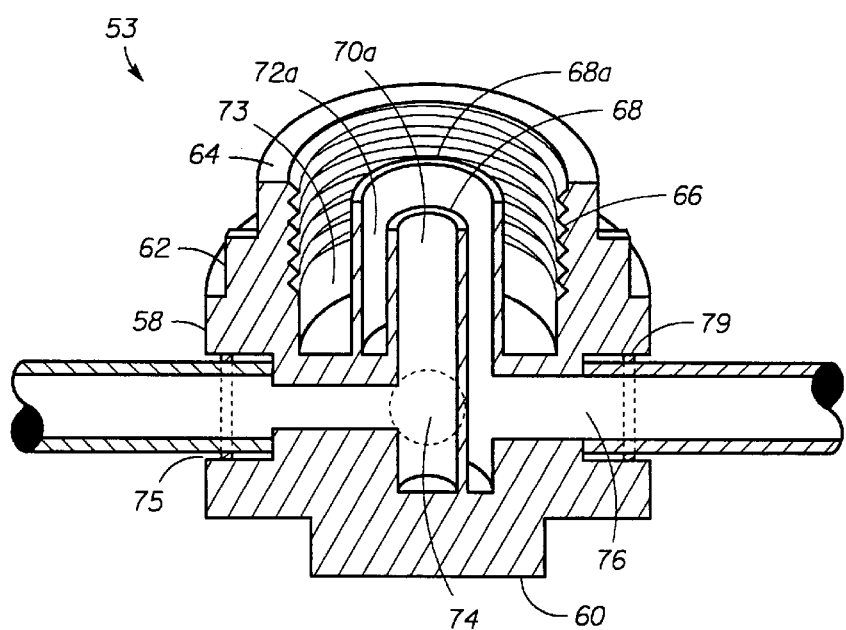
FIG. 13 is a perspective sectional view of a three-way cartridge mounting assembly of the present invention used for the reverse osmosis cartridge, the water storage bottle, and the flow control devices.

It The flowboard 12 may be somewhat better appreciated from FIGS. 3 to 9, and 23 which show vertical sections through the flowboard 12 and the different mounting blocks. These figures show the mounting blocks 52 for the solenoid valves 22 and 40, the sediment filter cartridge 24, the activated carbon filter cartridge 26, and ion exchange cartridge 30, the ultraviolet disinfection cartridge 32, the thermoelectric cooler 33, the circulation pump 38, the check valve 42, the vent disinfection cartridge 44 and the vent/drain gap cup 46. FIGS. 5 and 6 show the mounting assemblies 53 and 53a for the reverse osmosis cartridge 28, and the water storage vessel 34, respectively. FIGS. 4, 6, and 7 show the pipe fittings 51. The mounting blocks for the various cartridges are referred to, in FIG. 3, by the cartridge associated therewith. The details of a typical cartridge mounting block 52, and its connections to the respective conduits, so as to allow flow of water axially into and co-axially out of a cartridge received thereon, are shown in FIGS. 3 to 12 and 23. Referring now to FIGS. 12 and 14, the two-way mounting block 52 is the primary mounting block configuration in this invention. Mounting block 53 is a variation on the block 52. Each mounting block 52 is a generally cylindrical member 58 having a profiled locking extension 60 depending from the bottom to be received in a respective hole 54 in base 80 and a profiled upper end 62 to extend through the profiled aperture 56 in cover 90. Both the locking extension 60 and the upper end 62 are profiled, in any known manner, with means (here shown as flanges received in respective recesses) to insure a non-rotating mounting of the cartridge mounting blocks 52 in the flowboard 12. Each mounting block 52 further includes a cartridge receiving socket 64 extending above the cover 90. The upper end of the socket 64 is shown with an internal thread 66, but any known quick-lock connection, even a keyed or sized connection, could be provided to assure that only the correct cartridge will be inserted into the proper mounting block. Color coding could also be provided to distinguish each cartridge and its associated mounting block. An inner cylindrical member 68 is fixed, casted or extruded to the bottom of the socket 64 and extends co-axially therefrom to define an inner cylindrical chamber 70 and an outer annular chamber 72. Ports 74, 76 are connected to the inner and outer chambers 70, 72, respectively, and each port can serve as an inlet or as an outlet, depending on the direction of fluid flow. The mounting blocks 52 are of the same size and construction, with the possible exception of the orientation and number of the inlet/outlet ports 74, 76. The mounting block 52a (FIGS. 3, 6 and 7) differs from the standard mounting assembly by having one inlet (or one outlet) and two outlets (or two inlets) forming a Tee Branch mounting block. Such mounting assembly is used for the disinfection cartridge 32 (FIG. 7) and the circulation pump 38 (FIG. 6).

Figure 16A:
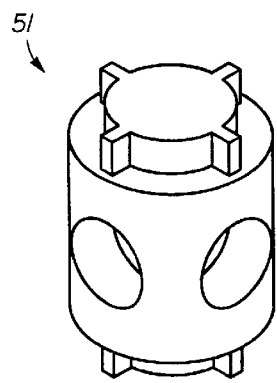
FIG. 16A is a perspective view of a 90-degree pipe fitting.
Figure 16B:
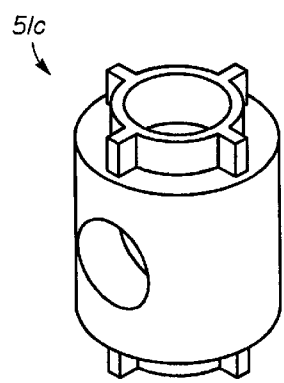
FIG. 16B is a perspective view of a 90-degree pipe fitting with the outlet at a vertical plan.

The mounting block 53 (FIG. 13) is a three way mounting block having ports 74, 76, and 77. This assembly is similar in size and external shape to mounting block 52, but it differs from the standard mounting block 52 by having a second cylindrical member 68a forming three concentric chambers 70a, 72a and 73a. Such mounting block is used when water of different quality or composition is separated into three streams. This type of mounting block is used for the reverse osmosis cartridge 28 (FIG. 5), where the inlet water is separated into a permeate stream and a reject brine stream. It is also used for the water storage vessel 34 to separate inlet water, outlet water, and overflow/vent streams (FIG. 6). Annular seal or gasket 78 (see FIGS. 4 or 5) is received on the flat upper end surface of the socket 64 to provide sealing between the mounting assembly 52, 52a or 53 and the cartridge mounted thereon. An "O" ring 81, to be discussed below in connection with the description of the cartridges, provides further sealing between the cartridge and the inner cylindrical chamber 70 of the mounting assembly 52. Pipe fitting or pipe junction 51 is another smaller size mounting block (FIGS. 16A and 16B). It is supported on the flowboard in a similar fashion, but serves as a fitting or junction to connect piping, provide flow branching or mounting small instruments. Block 51 (FIG. 16) is a 90° piping fitting used in several locations between cartridges. Block 51a, as depicted in FIG. 3, is a three way Tee Branch fitting used for combining flow to the storage vessel 34. Block 51b, as depicted in FIG. 3, is a four way Cross Branch used as a base for the needle valve 195 to control reverse osmosis reject stream 126. Block 51c (FIG. 16B) is yet another mounting block with vertical outlet for small instrument, such as a water storage high level switch 36 and for a water outlet spigot.

The flowboard 12 is designed to enclose all fittings and the conduits that connect the mounting blocks. The flowboard 12 could be constructed from plastic or a light metal, such as aluminum, and could be molded or even machined as one piece. The mounting blocks 51, 52, and 53 are preferably manufactured or molded from FDA approved plastics and are assembled and sealed with O rings 79, cement, glue or heat. The flowboard 12 is designed to accommodate normal water supply pressure, but will preferably operate at relatively low or negligible pressure. A low-pressure system will significantly reduce the cost of construction material and minimize the potential for leaks developing. The reverse osmosis cartridge 28 requires full supply pressure in oder to function efficiently. Therefore, the pretreatment section, including the sediment filter 24 and activated charcoal cartridge 26, and associated flow devices are designed to operate under the supply line pressure. The rest of system preferably operates under relatively low pressure.

Figure 9:
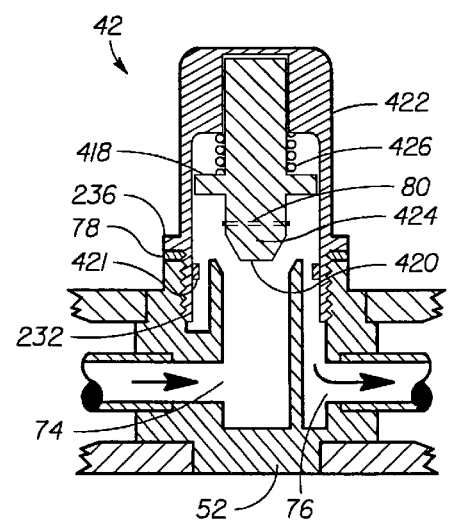
FIG. 9 is a vertical section through a check valve used in the present invention taken along line 9—9 of FIG. 3.

Turning again to FIG. 3, the water inlet 100 is connected to the flow control solenoid valve 22 by conduit 102. This valve is connected to the mounting block for the sediment filter cartridge 24 by means of conduit 104 and 106 via a 90° fitting 51 (FIG. 16A). Conduit 108 connects the sediment filter 24 to port 110 of linear valve 48. Conduit 114 connects the port 112 of linear valve 48 to a 90° fittings 51, which in turn is connected to the mounting block of the activated charcoal cartridge 26 by conduit 116. This charcoal cartridge connects to port 120 of the linear valve 50 by means conduit 118. Conduit 124 connects port 122 of linear valve 50 to the three way mounting block 53 of the reverse osmosis cartridge 28. Conduit 126 connects the reject water outlet of the reverse osmosis cartridge 28 to the drain 200 via a needle valve 195 mounted on a cross branch 51b, while conduit 128 connects the other permeate water outlet to the inlet of the mounting block 52 for the ion exchange cartridge 30. The outlet of the mounting block for the ion exchange 30 is connected by conduit 130 to port 132 of linear valve 50. For a normal flow pattern, water flows through the linear valve 50, then through conduit 136 connecting linear valve 50 and 48 at ports 134 and 138 respectively. Conduit 142 connects port 140 of linear valve 48 to the mounting block of the disinfection chamber 32. The outlet of the disinfection cartridge 32 connects to a 90° fitting 51, via conduit 144, which in turn connects to the port 148 of the linear valve 48 by conduit 146. Conduit 152 connects port 150 of linear valve 48 to a T-junction 51a. One outlet 154 of junction 51a is connected to port 156 of linear valve 50, for storage vessel 34 draining. The other outlet 158 of junction 51a is connected to the mounting block 53 of the water storage vessel 34 for filling and circulating water in the vessel. Water flows by gravity from water storage vessel 34 via conduit 160 to the water storage high level switch 38 and, thereafter, to circulation pump 38 via conduit 162. The pump 38 is mounted on a T branched mounting block 52a, as described earlier. The outlet branch 170 of this pump is circulated to the disinfection cartridge 32. This branch 170 connects to a 90-degree fitting 51. The outlet of this fitting 172 connects to a check valve 42 (FIG. 9). Conduit 174 at the outlet of check valve 42 connects to another 90°, which in turn reconnects to the mounting block of the disinfection cartridge 32. The other branch 164 from the mounting block of pump 38 connects to water dispensing solenoid valve 40.

Conduit 166 connects solenoid valve 40 with a 90° fitting, which in turn connects to the mounting block 51c of the water-dispensing spigot 16 by means of conduit 168.

Return to the water storage vessel, air and water overflow is vented outside the system through conduit 178, which is connected to the vent disinfection silver impregnated charcoal cartridge 44 mounted on standard mounting block 52. Conduit 180 connects the vent cartridge 44 to the mounting block inlet of the vent/drain gap cup 46. The outlet of cup 46 is connected by conduit 182 to a T branch 51a, which in turn connect to the drain port 200 by conduit 199. In addition, conduit 188 connects port 186 of linear valve 48 with port 196 of linear valve 50. Conduit 194 connects port 192 of linear valve 50 to the cross branch fitting for the needle valve 51b. Conduit 198 connects the Sib fitting to the T branch 51a.

Each linear valve 48, 50 has an axially extending rod 202, 204, respectively, upon which are fixed a plurality of spaced sealing members 206, 208, 210, 212, 214, in valve 48, and sealing members 216, 218, 220, 222, 224, 226, in valve 50.

FIG. 4 is a vertical section through a sediment filter cartridge 24 and an activated carbon filter 26. Each cartridge 24, 26 is shown engaged in a previously described mounting block 52. Typically each filter cartridge used in the present invention has a rigid cylindrical housing 230 14. with outwardly threaded first (bottom) end 232 and a similar outwardly threaded second (top) end 234. The first end 232 is threadedly received in mounting block 52 until shoulder 236 engages the seal 78, while second end 234 receives thereon an internally threaded cap 238. The cap serves for an opening to fill the cartridge with water treatment media and as a means to vent the cartridge for draining. The sediment filter 24 could employ a conventional filter element, in which case the cartridge is provided with threaded removable head 240 to facilitate inserting a preformed filter cartridge. A cylindrical insert 242 can be positioned co-axially in the housing 230 to define an inner axial chamber. The insert consists of a small-bore inner sleeve 244 that spans the length of the cartridge housing and loosely engages the cap 238. The lower insert section has an additional coaxial short outer sleeve 246 that shrouds and engages a lower end portion of inner sleeve 244. The sleeves 246 and 248 are joined to form one piece insert with no fluid communication there-between or there-along. The outer sleeve 246 is received in force fit sealing engagement into neck 248 of the housing 230. The inner sleeve 244 has an array of slots 250 at its upper end and the outer sleeve 246 has a similar plurality of elongated slots 252. The lower end of the inner sleeve 244 is received in the inner chamber 70 of the mounting block 52. An "O" ring seal 81 in mounted on the outside of the inner sleeve, which is preferably provided with an annular groove 254 to prevent dislocation of the O ring as the cartridge is mounted onto and dismounted from the mounting block 52.

Water conditioning media in the carbon and ion exchange cartridges 26 and 30, respectively, are preferably handled as bulk material and charged into their respective cartridge housings through caps 238. On the other hand, the sediment filter and preferably is in the form of manufactured filtration elements of suitable pleated or wound fibrous filtration material that may be encapsulated for insertion into the housing. For the sake of simplicity and safe replacement of used filter media 256, which could contain microbial growth, it is preferable to have the filter media encapsulated in the housing. This facilitates replacement and disposal of the filtration cartridges when exhausted. Removable heads 240 are provided in this invention to accommodate conventional off the shelf filtration elements. To maintain an annular flow pattern around the filtration element, a plurality of mounting members 258 will be provided at the bottom and top of housing to retain the filter element in place without obstructing flow around and through the element. Furthermore, sleeve 246 will be force fit to engage the inner core of the element bottom rubber flange 260, while an insert engages 262 the inner support core 266 of the element at the top flange to maintain proper sealing. In the case of filter cartridge 24 the flow of water has to pass out through slots 252 of the outer sleeve, flow annularly up and radially through the media and its cylindrical perforated support core 266, annularly up through space 264, radially in through the slots 250 at the end of insert 242, and axially down through inner sleeve chamber 243.

The activate carbon filter cartridge 26 is similar to the sediment filter cartridge 24, but the flow of water is reversed. The bulk water treatment media 268 is placed into this cartridge through the cap 238. The normal water flow will enter through port 74 into the inner chamber to flow axially upwardly through inner insert chamber 243 and flow annularly down through the filter media into outer chamber 74 and exit through port 76.

The reverse osmosis cartridge 28 (FIG. 5) contains a spiral wound semi-permiable membrane element 270 of the type described in U.S. Pat. Nos. 3,504,796 and 4,842,736. The cartridge in this invention is designed with single ended three way connections and mounted on a three-way mounting block 53.

The cartridge housing 230 is a bottle-like, similar to other cartridges, but without the upper cap 238. Filtered water from the charcoal cartridge 26 enters the reverse osmosis cartridge 28 through the outer annular chamber 73 of the mounting block 53, and passes upwardly through the reverse osmosis element 270. Water permeates through the membrane and passes downwardly through the perforated core sleeve 274 and downwardly through the annular permeate water chamber 278, to the middle chamber 72a of the same mounting block. Meanwhile, rejected high dissolved water continues its passage through the membrane layers and exits at the top of the reverse osmosis element 268. Reject water is continually drained through the inner reject tube 276 to the inner chamber 70a, and out of the reject water outlet port 75 of the three way mounting block 53. Both the outer core sleeve 274 and the inner reject tube 276 are sealed at the top 280 to prevent water back-mixing at the top of the cartridge.

To insure high water purity; a mixed bed ion exchange 30 (FIG.5) is installed down stream of the reverse osmosis cartridge 28. The mounting assembly 52 for the ion exchange cartridge is substantially identical to those described above and therefor need not be described again. The cartridge is also identical to the activated charcoal cartridge 26, but it contains strong cation and anion ion exchange resin mixture 282.

Water leaving the mixed ion exchange resin 30, inters an ultraviolet disinfection cartridge 32 to insure water purity at the point of use. FIG. 7 is a vertical section through the ultraviolet disinfection cartridge 32. The T branch mounting block 52a, as described earlier, is used to mount cartridge 32. The housing 284 for the disinfection cartridge 32 is made from either stainless steel or hard glass coated on its external surface with a reflective material, such as polished aluminum foil, in a manner similar to thermos bottles. The threaded neck 286 is similar to other cartridges threaded connections 232, and is adapted to be received in the mounting block 52a. An ultraviolet light producing means 288 is preferably formed by a single ended ultraviolet lamp 290 mounted within a protective sleeve 292 which in turn is co-axially mounted within an outer quartz or hard glass sleeve 294 defining an annular passage 298 therebetween. The outer sleeve 294 has plurality of holes 296 at its upper end to allow for water circulation as to be explained later. The ceramic mounting assembly 300 for the ultraviolet means 288 is received within cavity 302 against annular shoulder 304 and is held therein by internally threaded cap 306, which is received, the cartridge second (top) external threads 308. Preferably the subject system utilizes a low-pressure mercury vapor germicidal lamp which emits radiated energy at 2537 angstrom (or about 254 Nanometer). This is the region of wavelengths most lethal to microorganisms. These lamps are made of hard glass quartz or high silica glass for better transmittance. Maximum radiation intensity occurs when the lamp operates at 40° C., which normally can be reached within two minutes from turning the lamp on. Lower temperature operation results in less intensity. For personal safety and handling, each lamp is normally jacketed within a quartz sleeve.

A preheat, start hot cathode, single lamp with a ceramic base is preferred for use in this system. This lamp should operate constantly to insure continuous disinfecting, since ultraviolet energy has no residual effect in water. However, operating an ultraviolet lamp continuously will generate sufficient heat to increase water temperature, particularly over long time periods. Water could be subject to germicidal contamination if the disinfecting action of the ultraviolet lamp is interrupted for any substantial period of time, for example due to infrequent use of the unit. Alternatively, instant start lamps could be used to reduce the heat significantly, but these generally require expensive, bulky ballast. The use of preheat start lamps has the advantage of using standard off the shelf fluorescent light ballast which is both small in size and economical to operate and maintain.

The subject system provides a second sleeve, of quartz or hard glass 294, to allow for an aanulus space around the lamp's protective sleeve 292. In order to insure water disinfection in the storage vessel 34, it is necessary to circulate the stored water periodically, with a timer, or continuously to insure its quality. Therefore, water is circulated from the storage vessel 34 by means of a circulating pump 38, through the ultraviolet disinfection cartridge 32, back to the storage vessel 34. A two way mounting block with a T branch 52a is used to allow regular flow from the ion exchange cartridge 30 and the circulating flow from the storage vessel 34 to enter the disinfection cartridge 32. Water enters the T branch mounting assembly 52a for the ultraviolet disinfection cartridge 32, passes upwardly through the cartridge annular cavity, radially through holes 296 at the upper end of quartz sleeve 294, downwardly in annular passage 298, and leaves the cartridge through chamber 70 of the inner cylindrical member 68 of the mounting block 52a.

Public health service water standards require that the minimum dosage of 16,000 micro-watt-second per square centimeter must be applied at all points throughout the disinfection chamber. The disinfection chamber is sized to maintain residence time; based on output water flow (1 liter per minute), that meets or exceeds this criterion.

Since water purification by reverse osmosis is rather slow, a storage vessel 34 is provided to accumulate purified water to meet instantaneous demand. The vessel 34 is an inverted bottle like container, preferably molded of transparent polymer material, suitable for potable water storage. The mounting block 53a (FIG. 6) for the storage water vessel 34 is a three-way mounting block. This block is substantially similar to mounting block 53 described above for the reverse osmosis cartridge 28, except for slightly shorter inner annular members 68 and 68a. These shorter members prevent any minor overflow of water, outside the mounting assembly, when the vessel 34 is detached. The vessel 34 consists of a housing 310, which is extruded to a narrow neck 312 and has a threaded end 232 and a neck shoulder 234. This vessel's threaded end easily engages the thread 66 on mounting block 53a, in a similar fashion to other cartridges described above. The water storage vessel 34 for home usage could be detached, when full, for the purpose of transportation or refrigeration. Therefore, the top end 314 of the vessel 34 has a contoured rim to maintain the vessel in upright position, when placed on a counter. It is also provided with a spill proof insert 316 (FIGS. 6, 10, and 11) placed in the neck 312 of the vessel 34 and engages the inner annular elements 68 and 68a of the three-way mounting block 53a. The insert 316 consists of an outer sleeve 318 that can be easily forced in the neck 312 of the water storage vessel 34 and retained in place with rim 322. The outer sleeve 318 contains an array of slots 320 to allow water to flow from vessel housing 310, downwardly through the annular space 73 of the mounting block 52a (FIG. 6). This sleeve 318 also has an internal annular flange 324. The upper end of the outer sleeve 318 is threaded 326 to engage a threaded shank 328 which support the purified water feed tube 330. This tube 330 has a groove 332 located at its lower end and accommodate an "O"ring 334 to maintain a seal between the aforementioned tube and another inner sliding sleeve 342. The overflow tube 336 runs coaxially inside the water feed tube 330 and extends further out to allow for air breathing (air intake and exhale) due to water level fluctuation in the water storage vessel 34. The inner overflow tube 336 and the outer water feed tube are secured together as one element by means of two perforated retention plates 340 located at the top and the bottom ends of feed tube 330. To maintain a spill proof insert, the overflow tube 336 has an external circular flange 338 on the same plane as the internal annular flange 324 of the outer sleeve 318. These two flanges form a continuous annular seat 339 that can be completely sealed with an annular rubber seal 346 mounted at the end of a sliding sleeve 342 biased into sealing position under the tension of a spring 344. Furthermore, the lower end of the overflow tube has preferably a groove 254, which accommodates an "O" ring 81, in a fashion similar to previously described cartridges.

Upon mounting the storage water tank 34 on its threaded, three-way mounting block 53a, both internal circular elements 68 and 68a engage simultaneously the internal parts of the insert 316 to establish a seal. In this case, the lower end of the overflow tube 336 and its "O" ring seal slides through the inner cylindrical member 68 of the mounting assembly 53a which maintains a seal. Meanwhile, the middle cylindrical element 68a of the mounting assembly 53a engages the annular seat 339, forcing the annular rubber seal and its supporting, spring-loaded, sliding sleeve 342 to retract. As a result, three independent channels are created within the water storage vessel insert 316. The outer channel allows water to flow from the water storage housing 310 through the outer chamber 73 of the three-way mounting block 53a. The intermediate channel allows water to flow from the intermediate chamber 72a of the mounting block 53a to the housing 310 for storage. The inner channel connects the overflow tube 336 with the inner chamber 70a of the mounting block 53a to drain or vent the storage vessel housing 310 through holes 320.

Upon disconnecting the water storage vessel 34 from its supporting block 53a, the rubber seal 346 extends under the expansion force of spring 344, preventing water from flowing through the insert slotted hole 320, and consequently prevents spillage. Since the internal cylindrical members 68 and 68a of the mounting block 53a are slightly shorter than the outer rim 64 of block 53a, minor spills due to detachment of the vessel can be prevented and properly drained without causing overflow. After disconnecting the storage vessel 34, it could be placed up side down on its rim 314. The vessel insert 316 could be removed for further use on another vessel, and a conventional bottle cap could be used to seal the water container for storage.

Water flow from the storage vessel 34 to the dispensing spigot 16 is by gravity, but to insure proper disinfection of stored water, a small, single ended, vertically mounted, seal-less magnetic or direct drive pump 38 is included for circulating water through the ultraviolet disinfection cartridge 32. The seal-less magnetically driven pump 38, which is based on the phenomenon that a rotating permanent magnet induces the rotation of a shielded, magnetically susceptible element within the magnetic field of the magnet, is described with reference to FIGS. 2, 6, 17 and 18. The pump 38 consists of a driver housing 350 is securely attached to a pump casing 390. The driver housing 350 encloses the driver assembly and the pump casing 390 houses the impeller assembly 365. Referring to driver housing 350 (FIG. 17 and 18), it is a cylinder of preferably non metallic material with a detachable top head 355 and an integral bottom flange 351 to couple the driver housing 350 to the pump casing 390. This driver housing bottom flange 351 could be, but is not limited to, a threaded connection or flange containing a series of equally spaced holes 354. This flange and holes match an equivalent arrangement 392 on the pump casing 390 for bolting these two pump parts together. Two concentric, positive and negative electrical contact strips 356a and 356b mounted on insulating padding 356c on the driver housing top head 355. These strips are connected internally to the electric motor 352 leads (from the motor brushes) and externally to a power supply (preferably DC) fixture, attached to the water purification system housing 14. The strips provide simple wire-less electric contact, regardless of the position of the motor leads with respect to the supply fixture. The motor 352 is securely placed in the driver housing 350. It rests on a retention ring 353 integral to the housing 350. The housing head 355 is provided with a compression ring 355a, which forces the motor 352 in place, upon securing the housing head to the housing cylinder. The motor shaft 360 extends axially through the housing and is securely connected to a sleeve 363. This sleeve is bonded to a strong permanent cylindrical magnet 362 with a hollow core 364. Rotation of the motor causes magnet 362 to rotate at the same speed. The housing 350 is provided with ventilation holes 357 at the housing head 355 and ventilation holes 358 around the housing cylinder, which are sloped outwardly to avoid splashing electrical parts with water.

The pump casing 390 houses the impeller assembly 365. This assembly 365 consists of two-coupled stationary, non-magnetic housings 367 and 367a. The upper housing 367 has a closed end cylindrical extension 366 which is received as a loose liner within the drive magnet core 364. The lower open end of housing 367 has a wide rim or flange 368. This rim is held in place, along with the impeller housing 380, between the pump-housing flange 351 and the pump-casing flange 392. A groove 370 accommodates a sealing element 384 provided between the two housing sections of the impeller assembly 365. This upper housing section of the impeller assembly, physically, isolates the drive magnet 362 from the fluid contained inside the impeller housing. The impeller magnet 376 supports at its lower end a fixed radial vane type impeller 372. Both the impeller and its magnet rotate freely on a properly secured impeller shaft 374. The impeller shaft 374 lower tip resets on a friction washer 375, placed on the impeller thrust member 387, which is an integral part of the impeller housing intake conduit 386. The upper tip of shaft 374 is secured in impeller magnetic housing 366 on a thrust member 369. This housing 366 encloses the drive magnet hollow core 364 and separated therefrom by a friction washer 361. Proper clearance and alignment of rotating elements is provided to insure low friction and higher pump efficiency. The lower section also has flange 380 with a similar groove 382 that can be secured in place along with the upper housing section flange 368 as indicated. The impeller assembly 365 intake pipe 386 has a groove at its end 254 that accommodates a sealing element 81 and is easily mounted in the cylindrical element 68 of the mounting block 52.

The vertical wall of the impeller housing 378 contains series of holes 388 (preferably tangential) for fluid discharge. Both the impeller magnet housing 367 and the impeller housing 378 are coupled together on top of the casing gasket 394 between the flanges of the pump drive housing 350 and the pump casing 390 to encapsulate the impeller and its magnet. The casing has a flange 392, which matches that of the pump housing 352 and can be bolted together. A gasket 394 is provided on the flange 392 placed under the impeller assembly-housing flanges to insure proper seal. The pump discharge is extended through the bottom of the pump external casing 390 to a single ended concentric threaded outlet 395, which can be easily engage the thread 64 of a mounting block 52*a*. The pump can be easily installed or replaced without tools.

The illustrated pump 38 is a single stage pump (single impeller). This pump can be further developed as a multi-stage pump (multi-cascading impellers), or a positive displacement pump, to produce higher discharge pressure that could be required for certain applications.

Figure 8:
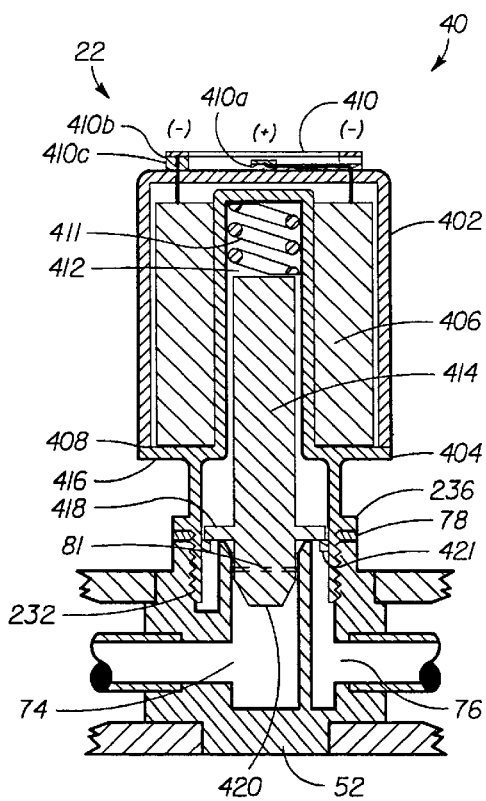
FIG. 8 is a vertical section through a solenoid used in the present invention taken along line 8—8 of FIG. 3.

Another uniquely designed single ended, top mounted flow control device is the solenoid valve incorporated into the present invention and illustrated in FIG. 8. It can function either as a "normally opened" inlet water solenoid valve 22 or a "normally closed" dispensing water solenoid valve 40. The principal of such device is based on the fact that the passage of direct electric current through a uniformly wound coil of wire, in the form of a cylinder, having a length much grater than its diameter, commonly known as solenoid, creates a magnetic field that draws a core or plunger, usually of iron, into the solenoid. The subject device consists of two-part housing 402 and 404. The upper part is the coil housing 402 and encapsulates a wire coil 406 mounted on the external surface of the plunger housing extended flange 416. The coil is completely isolated from the fluid. The coil housing 402 is supported on the plunger housing extended flange 416 and epoxy sealed at junction 408. The coil housing 402 includes at its top two concentric electrical contact strips 410*a* and 410*b*, placed on an insulated padding 410*c*, and connected internally to the solenoid coil and externally to an AC or DC power supply fixture placed in the water purification housing 14. The Plunger 414 is a cylindrical iron rod exposed to fluid, contrary to other designs. Therefore, it is externally coated with epoxy or equivalent polymeric material to prevent rust formation. The plunger moves freely in a vertical plane through the plunger chamber 412. The plunger has a rim 418 close to its lower end to prevent the plunger from dropping through the solenoid valve mounting assembly 52. The plunger, in the closed position, rests on the inner cylindrical element 68 of mounting block 52 under its own weight or biased by means of a spring 411. The plunger tip 420 is slightly tapered to easily engage the mounting assembly internal cylindrical element 68. It also has a sealing element 81 placed in a groove 254 to maintain proper seal with the element 68, which also serves as a seat for the plunger. When initiating a current through coil 406, the solenoid is activated and the plunger is forced to close or to open, depending on the function of the valve. For example, solenoid valve 22 is normally open and the water supply pressure tends to maintain the plunger levy away from its seat, allowing water to flow. When the storage vessel becomes full, a level switch 36 activates solenoid 22 and forces the plunger 414 to engage element 68 and prevent water from flowing. On the other hand, the dispensing solenoid valve 40 is normally closed. In this case, the water supply is through the outer annular chamber 72 of the mounting block 52 and water forces the plunger to stay in the closed position. When the dispensing switch 41 is depressed and the valve is activated, the plunger lifts off allowing water to flow through he water spigot. The valve is a single ended device, with a threaded bottom outlet 394 for engaging the thread 66 of a mounting block 52 in fashion similar to all the other described devices. The valve can be easily installed or replaced without tools.

Another single ended; vertically mounted device is the check valve 42 shown in FIG. 9. This device allows water to flow only in one direction. It is also mounted in an identical fashion to the previously mentioned cartridges and devices using mounting block 52 and requires similar threaded connections 232 and sealing elements 81. This check valve 42 consists of valve body 422 that has shoulder 236 and engages the thread 66 of the mounting block 52 using a gasket 78 to maintain a seal. The valve body supports a short spring 426 loaded plunger 424 that has slightly tapered tip 420 to easily engage the mounting block internal cylindrical element 68. It also has a sealing element 81 placed in a groove 254 to maintain proper sealing with the element 68, which serves as a seat for the plunger.

Another flowboard mounted device is the high level switch 36. This type of device including level, pressure, temperature, or conductivity sensors, requires only one point for sensing flow condition. Therefore, it is mounted on an inline pipe fitting 51*c*. These devices are of conventional design, but are adapted to meet the installation pattern of the subject water purification system. These instruments include at their top two concentric, opposite polarity, electrical contact strips 410. These contact strips are connected internally to the sensor elements and externally to the circuit of the device to be controlled (such as a solenoid valve). These contact strips engage spring-tensioned contacts of equivalent size, aligned above each device and mounted within a protective socket integral to the system housing. Wires connecting the power supply to the electrical socket of each device or instrument are shielded in a protected compartment at the top of the system housing.

Other single ended devices include the vent disinfection silver impregnated charcoal cartridge 44 and vent/drain gap cap 46 (FIG. 2 and 6). These devices are also supported and installed using the same mounting blocks and the same threaded connection and sealing elements as previously described. The cartridge 44 consists of housing 430, which contains activated charcoal impregnated with silver 432 placed within a filament sac 434 to inhibit entrance of airborne microbes that could possibly enter the system and grow during storage tank filing and emptying. This small cartridge has a vent tube 436 at its core secured at the top of the housing top center 438 to allow for air or water movement across the media 432. The vent/drain gap cup 46 is actually a small cup open top having a short cylinder wall 440, with a threaded connection mounted on block 52. It is intended to maintain a physical gap between the drainage and the sewer system, and the vent system of stored water vessel 32 to prevent microbial contamination, in case of back flow of the drain system for any unforeseen reason. In such case, backed up drain water overflows the cup and does not penetrate the storage vessel 32.

In normal operation, as shown in FIG. 3, water enters inlet 100, flows through conduit 102 to the normally opened solenoid 22, conduit 104 to fitting 51, and conduit 106 to the coaxial inlet sediment filter 24. The water exits the sediment filter 24 axially and passes to the activated charcoal filter cartridge 26 via conduit 108, port 110, linear valve 48, port 112, conduit 114, fitting 51, conduit 116 to the axial inlet of charcoal cartridge 26. Flow in the sediment filter 24 is upward and external to the filter media to replace air in the media. The flow in the activated charcoal 26 and ion exchange 30 cartridges is downward to prevent any bed disturbance (more efficient). Again the water flows axially into the activated charcoal filter cartridge 26 and exits co-axially to pass through conduit 118, port 120, linear valve 50, port 122, conduit 124 to the reverse osmosis cartridge 28. In the reverse osmosis element, water permeates through the membrane, under supply header pressure, and the permeate flows axially through conduit 128 into mixed bed ion exchange cartridge 30. Meanwhile, the concentrated brine from the reverse osmosis cartridge exits through conduit 126, needle valve block 51b, conduit 198, T branch fitting 51a, and conduit 199 to drain port 200. Returning to the mixed bed cartridge 30, the outlet from this cartridge is connected to the ultraviolet disinfection cartridge 32 via conduit 130, port 132, linear valve 50, port 134, conduit 136, port 138 of linear valve 48, port 140, and conduit 142 to enter coaxially into the disinfection cartridge chamber. The outlet from the disinfection cartridge 32 exits this cartridge axially and flows to the storage vessel 34 via conduit 144, fitting 51, conduit 146, port 148 of linear valve 48, port 150 of valve 48, conduit 152, T branch fitting 51a, and conduit 158 to axially enter the storage vessel 34. Stored water is either periodically or continuously circulated through the disinfection unit to insure its hygienic quality. Therefore, water exits coaxially from the storage vessel and flow via conduit 160, high level switch 36, conduit 162, circulation pump 38, conduit 170, fitting 51, conduit 172, check valve 42, conduit 174, fitting 51, and conduit 176 to coaxially enter the disinfection cartridge 32.

To dispense water from spigot 16, water flows via the second outlet of pump 38, conduit 164, solenoid valve 40, conduit 166, fitting 51, conduit 168, and fitting 51c to spigot 16. In addition, during storage vessel filling or emptying, air is displaced. Air enters or leaves the storage vessel 34 axially via conduit 178, vent disinfection cartridge 44, a conduit 180 to vent/drain gap cup 44 where air is vented or induced.

In the start up, flush or purge mode, the linear valve 48 would be manually rotated, clockwise, to move all the sealing elements 206, 208, 210, 212, 214 on this valve simultaneously inwardly (downwardly as shown in FIG. 3). The linear valve 50 would be manually rotated, counter clockwise, to move all the sealing elements 218, 220, 222, 224, 226 on valve 50 simultaneously outwardly (upwardly as shown in FIG. 3). Both actions isolate the ultraviolet disinfection cartridge 32, the reverse osmosis cartridge 28 and the mixed bed ion exchange cartridge 30. Here the water path changes (reverses direction) and it flows through port 110 of the linear valve 48, port 138 of the same valve, conduit 136, port 134 of linear valve 50, port 120 of the same valve, and conduit 118 coaxially through the activated charcoal cartridge 26 and fluidizes the bed. Water containing charcoal dust and broken particles exits cartridge 26 axially to the drain via conduit 116, fitting 51, conduit 114, port 112 of linear valve 48, port 186 of the same valve, conduit 188, port 196 of valve 50, port 192 of the same valve, needle valve block 51b, T branch fitting 51a, and conduit 199 to drain port 200. Seals 206, 214, 216, and 226 serve to prevent water leakage through the ends of linear valves 48 and 50 respectively. Valve 50 is used to drain the system. It is manually rotated to move the sealing elements 218, 220, 222, 224, and 226 inwardly (downwardly in FIG. 3), accessing all ports to drain via linear valve 50. Loosening the cap 238 on top of the activated charcoal cartridge 26 allows air to displace water and enhance siphoning of water from this cartridge to drain.

Figure 17:
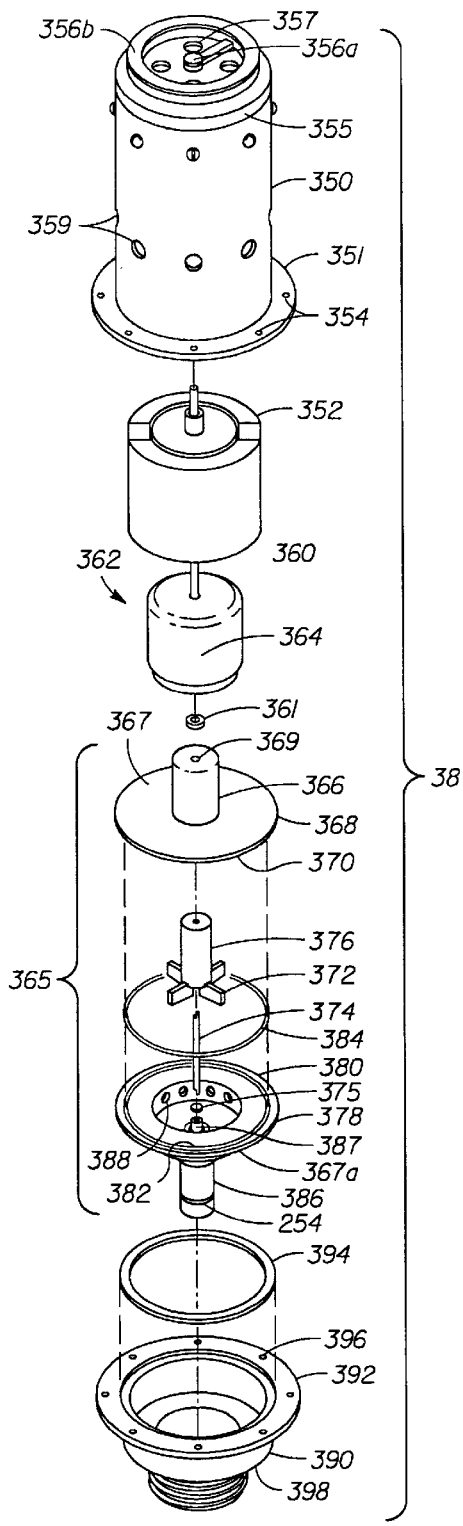
FIG. 17 is an exploded isometric of the magnetically driven pump of FIG. 18
Figure 18:
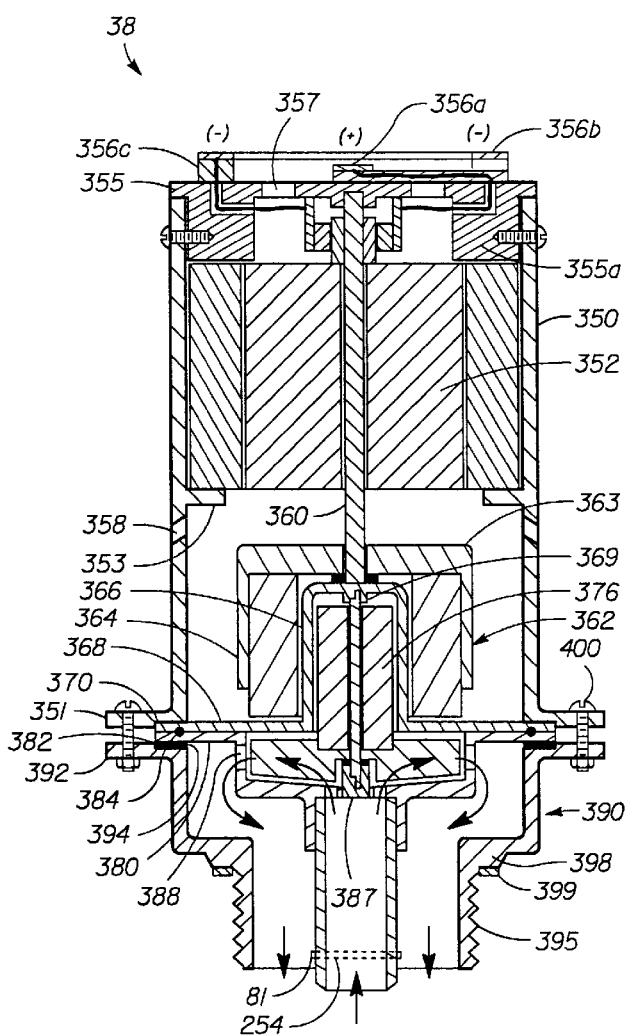
FIG. 18 is a vertical section through the magnetically driven pump of FIG. 17
Figure 19:
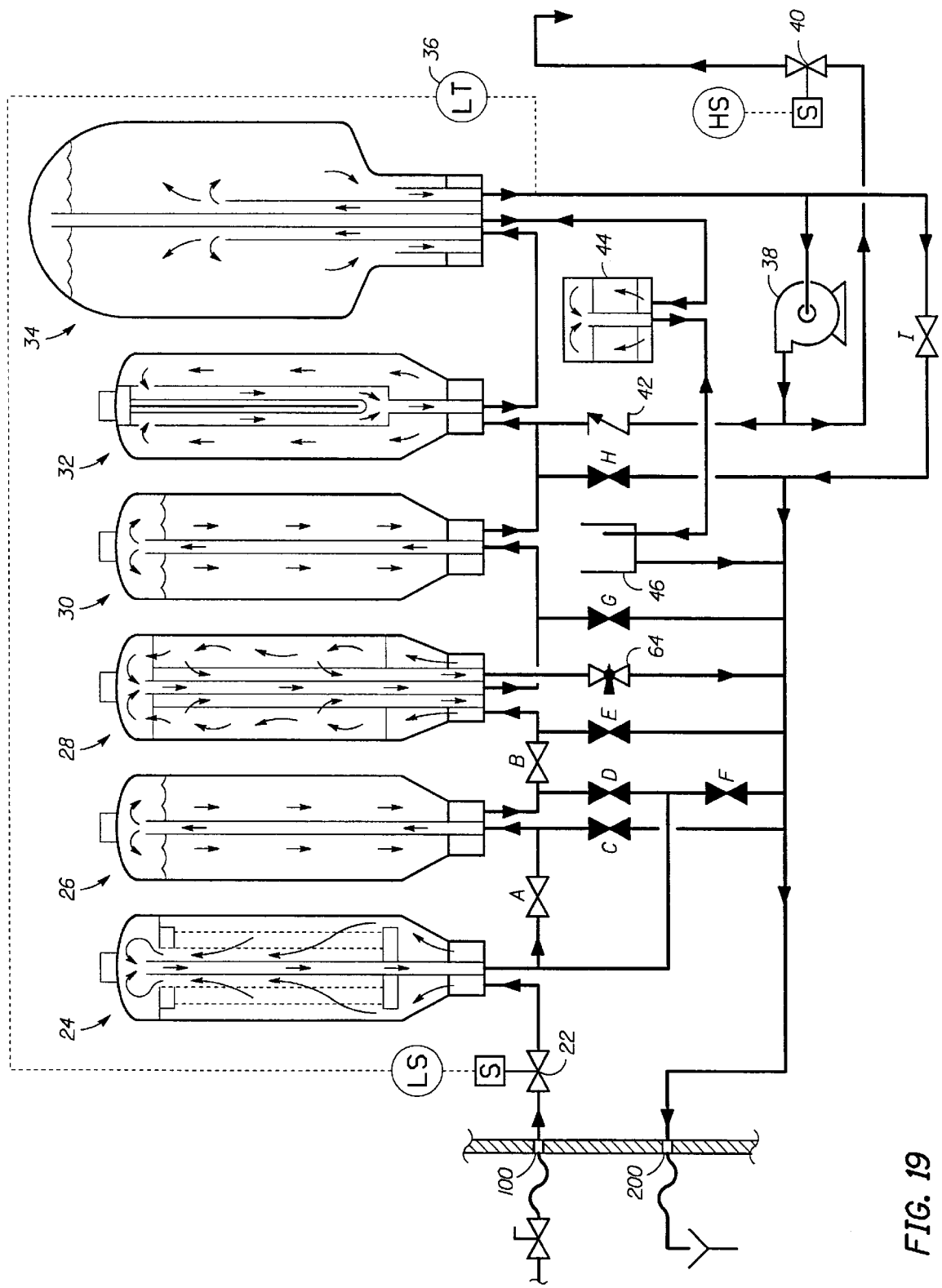
FIGS. 19 to 21 are diagrammatic views of the present invention showing, respectively, the flow path through the system in the normal service mode; in the start up, flush and purge modes; and in a drainage mode in preparation for cartridge replacement.

FIG. 19 is a diagrammatic side elevation of the present invention showing, by means of arrows, the flow path through the system in the normal service mode. Flow through the ion exchange and carbon beds is downward through the respective beds for higher efficiency. The segments of linear valves 48 and 50 have been shown as individual valves for ease of understanding the operation of the present invention. As shown in FIG. 17, valves C, D, E, F, G, and H would be closed. Flow is through valves A and B.

Figure 20:
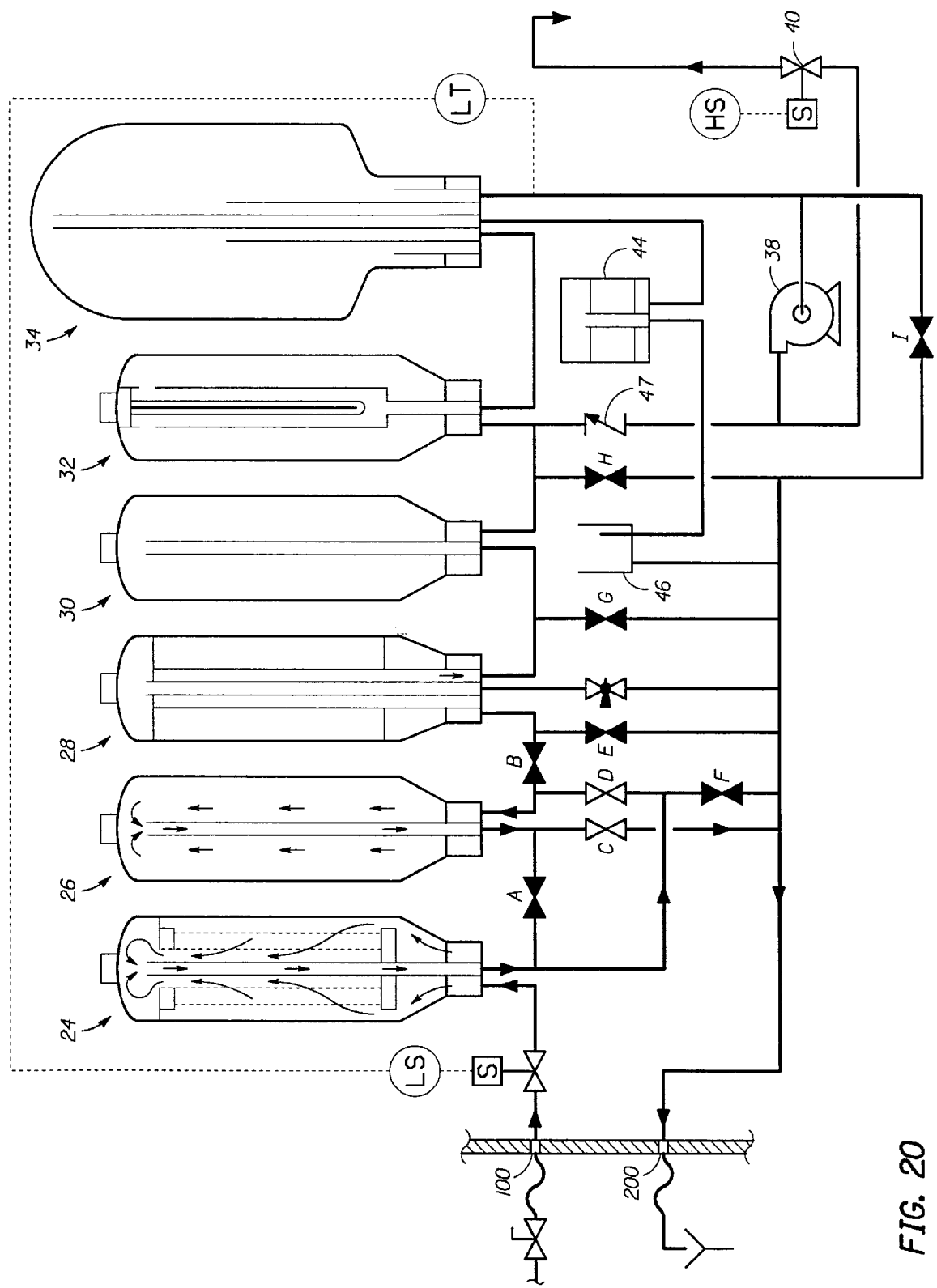

FIG. 20 is a similar diagrammatic side elevation of the present invention showing, by means of arrows, the flow path through the system in the start up, flush and purge modes. In order to operate the system in the normal mode, all ion exchanger and activated charcoal cartridges must be vented to allow the release of trapped air. Presence of air in these cartridges will significantly prevent proper contact and thereby reduce the efficiency of the exchangers and filters. In addition, new cartridges could contain broken particles and/or charcoal dust that could accumulate on the last filter and completely plug it. Therefore the system provides for the flushing and purging of these cartridges upon system startup. In this instance, valves A, B, E, F, and H are closed. Flow is in from the inlet through the sediment filter 24, valve D, coaxially through activated charcoal cartridge, axially through valve C to drain. This mode would be used to clean the system of any impurities which may have been introduced during assembly, and/or transport of the system.

Figure 21:
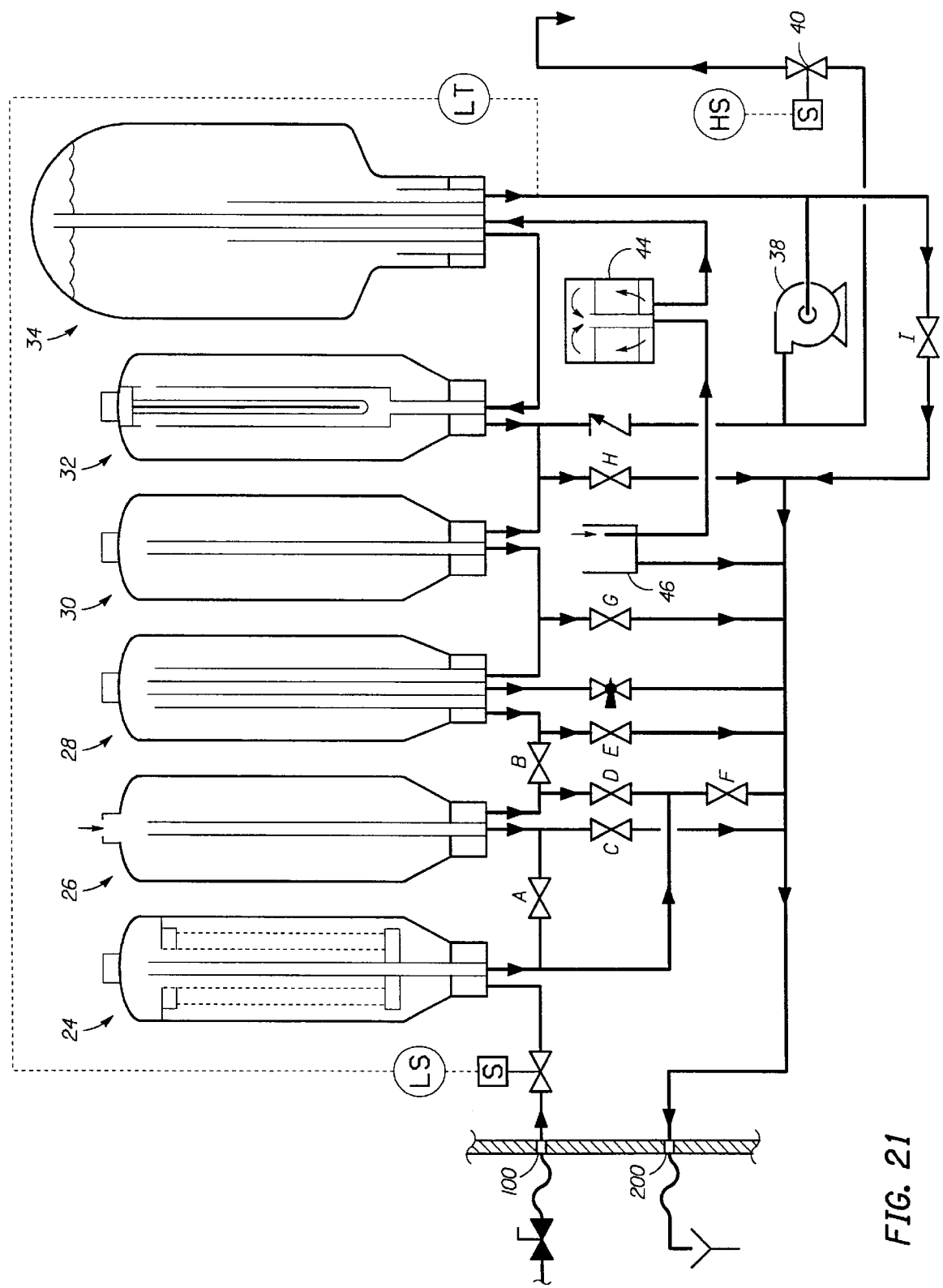

FIG. 21 is a similar diagrammatic side elevation of the present invention showing, by means of arrows, the flow path through the system for a drainage mode in preparation for cartridge replacement or removal of the subject system to a new location. In this instance all valves but the external block valve are open. Air is admitted to the system through the open tap (not shown) and an open cap for activated charcoal filter 26. Water drains, by siphoning, from ultraviolet sterilizer 32, through the open valves and out drain 200. Water in the activated charcoal filter 26 drains through open valve C to drain 200 and water in ion exchange 30 drains through open valve G to drain 200. Sediment filter 24 is a coaxial upward flow cartridge. Admitting air to this cartridge will only empty the axial tube, but not the annular space. Siphoning will not occur unless air is admitted. The cartridge can be removed with only minor dripping.

Figure 22:
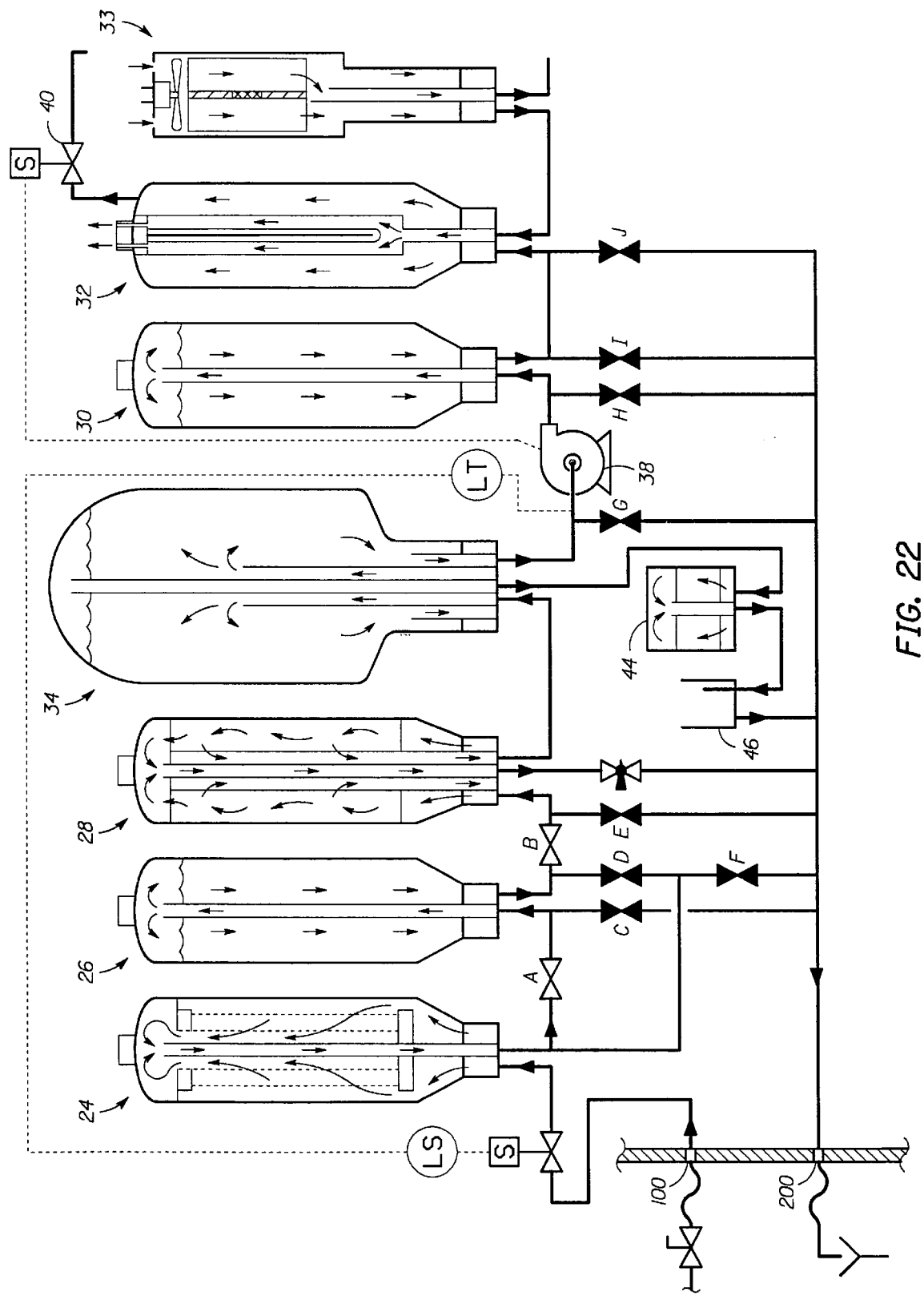
FIG. 22 is a diagrammatic view of an embodiment of the present invention for high purity water requirements, such as in laboratories.

FIG. 22 is a diagrammatic side elevation showing the normal flow pattern for the second embodiment of this invention. This embodiment is intended for commercial application (medical or laboratory) to provide purified water at the point-of-use. In this embodiment, the storage tank 34 is located intermediate in the flow path. A mixed bed ion exchange 30 and temperature controlled disinfection unit 33 are provided. The ion exchange is located down stream of the storage tank to insure the removal of any dissolved gases that could occur during storage. A single ended, top mounted pump 38 is used to overcome the pressure drop across the ion exchange bed. The subject system provides a second sleeve, of quartz or hard glass, to allow for annulus space around the lamp's protective sleeve. Patent application Ser. No. 08/920,842 filed by the inventor Aug. 29, 1997, describes in detail the design of such a cooling system. A forced convection air draft, by means of a fan operating either independently or in conjunction with cooling fan/thermoelectric device assembly 33, may be employed for flowing cooling air in the annular passage around the ultraviolet lamp thereby cooling the lamp.

Figure 24:
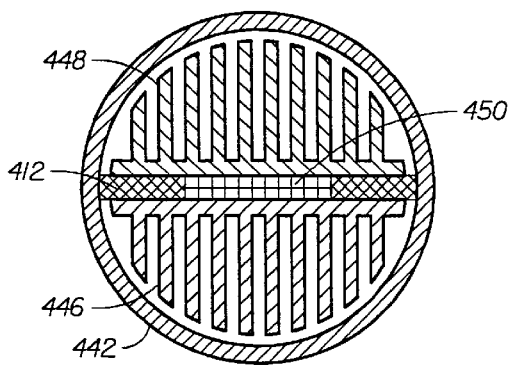
FIG. 24 is a transverse cross section through the thermoelectric device taken along line 24—24 of FIG. 23.
Figure 23:
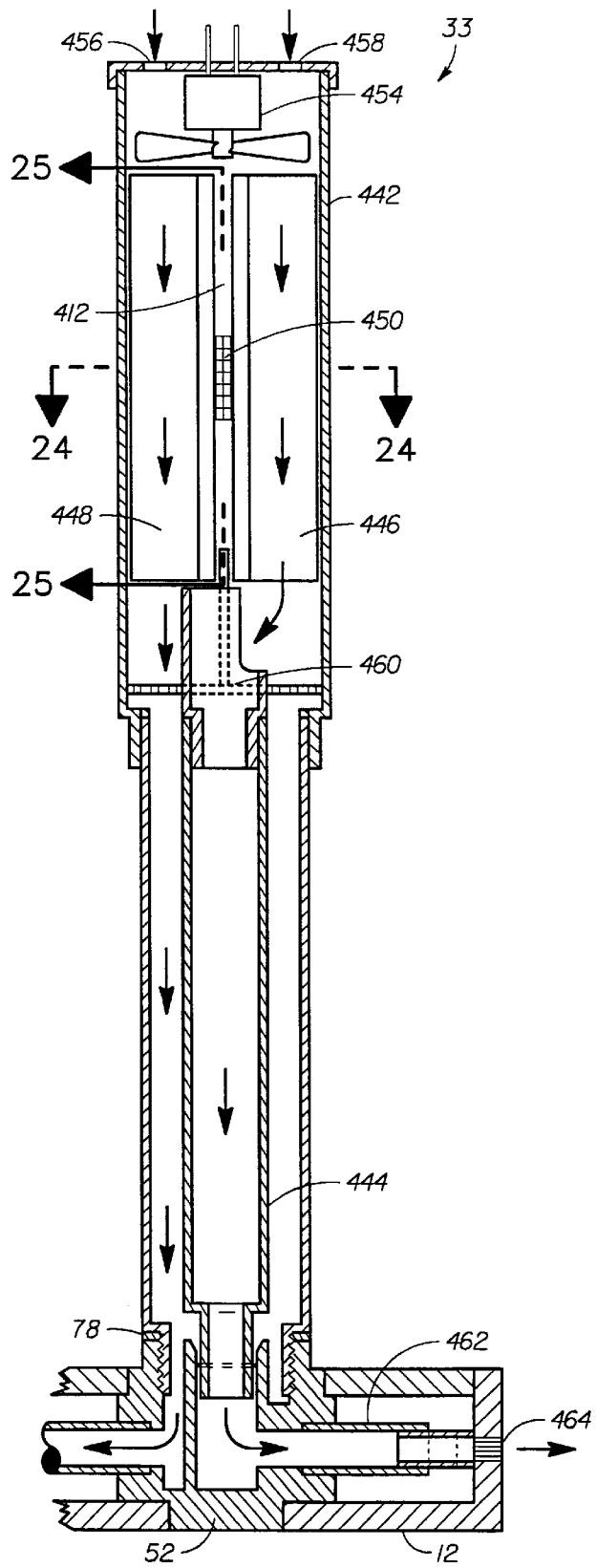
FIG. 23 is a vertical section through a thermoelectric cooling device for an ultraviolet cartridge and its as required for the embodiment of FIG. 22.
Figure 25:
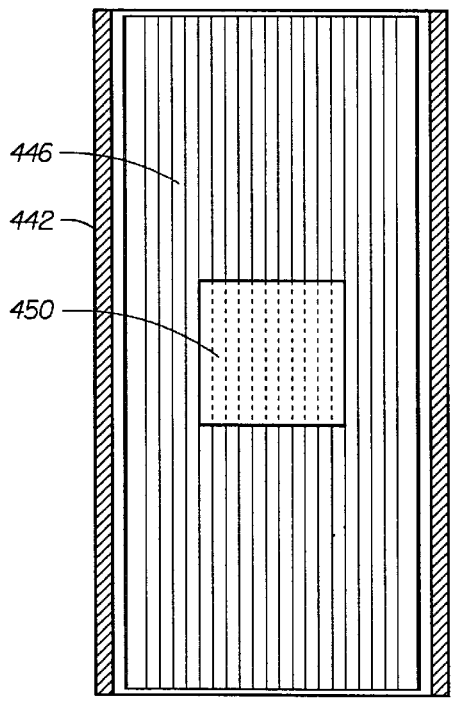
FIG. 25 is a longitudinal section of the thermoelectric convection device taken along line 25—25 of FIG. 23.

Turning to the cooling fan/thermoelectric device assembly, shown in FIG. 23, again the mounting block 52 is as described above. The assembly includes an outer housing 442, a coaxial inner duct 444, pair of thermoelectric hot and cold convection blocks 446 and 448 separated from each other with suitable insulation 452, a DC operated thermoelectric device 450, a fan assembly 454 and a cover 456 having a plurality of vent openings 458 therein. The fan assembly 454 draws in ambient air through vents in the cover 456. The air is driven downwardly through the thermoelectric convection means, which means cools the outer annular curtain of air while the axial inner airflow is heated. The hot air passes through conduit 462 to be expelled from a flowboard side vent 464. Cooled air passes through conduit to the disinfection chamber 22, previously described, where it maintains the temperature of the annular space around the ultraviolet lamp. FIG. 24 is a section taken along line 24—24 of FIG. 23 and FIG. 25 is a section taken along line 25—25 of FIG. 23 showing the heat convection blocks 446, 448 and thermoelectric device 450.

The thermoelectric device is based on the Peltier effect. When a direct current flows through a circuit comprised of different conductors (dissimilar materials) one junction between the materials is cooled while the other is heated, depending on the direction of current flow. Thus the device acts in much the same manner as a heat pump.

Cooling air for the disinfection chamber 32 is provided by the cooling fan/thermoelectric device assembly 33 to pass annularly around the ultra violet lamp assembly of the disinfection chamber to prevent the over heating thereof. The spent cooling air is exhausted through vent means in the ceramic mounting assembly of the ultraviolet lamp. Thereafter, the air flows through a vent means 20 in the unit housing (FIG. 1).

Figure 26:
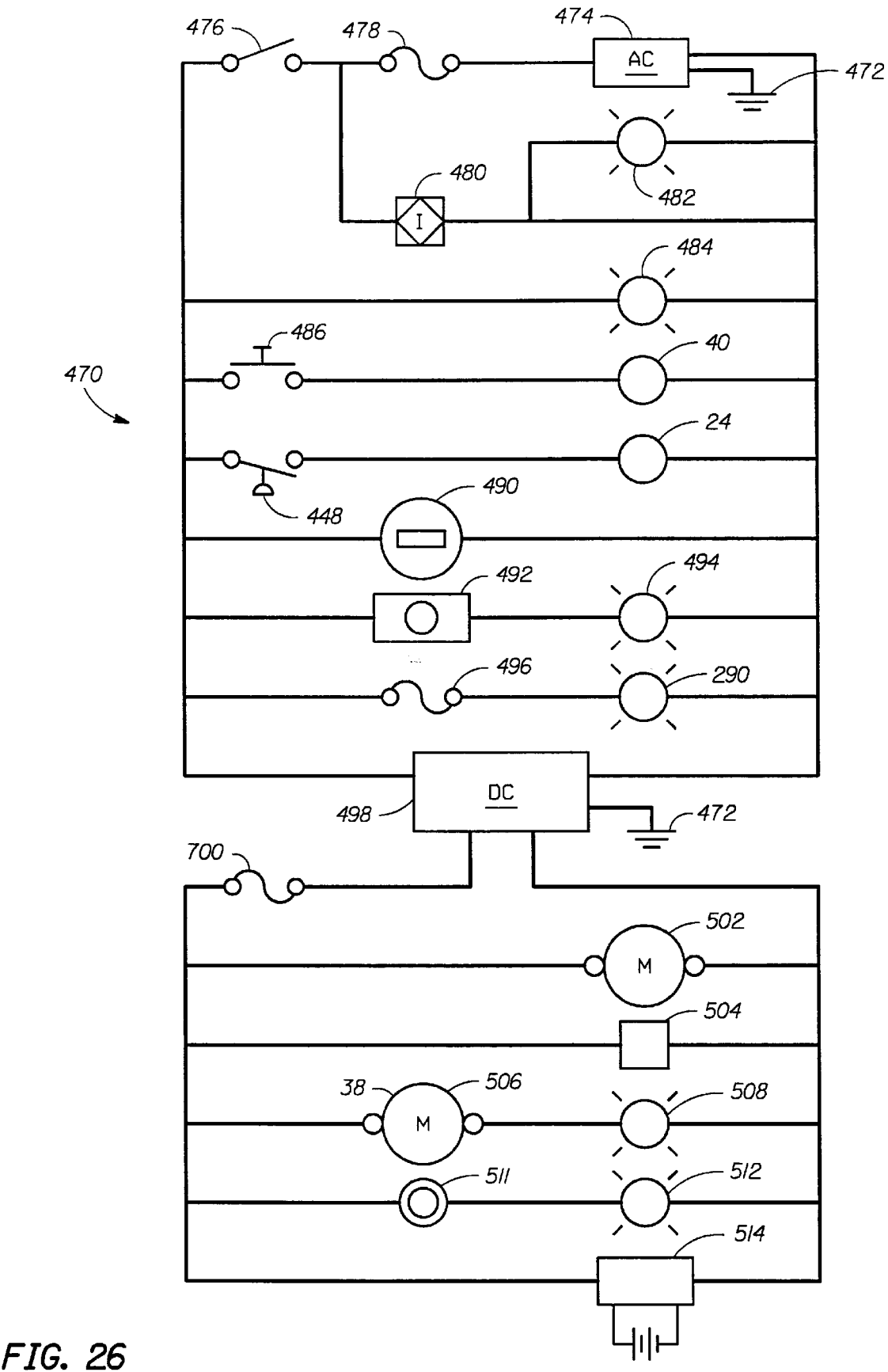
FIG. 26 is an electrical schematic for the subject invention.

FIG. 26 is an electrical schematic 470 for the subject invention. The electrical circuit must be grounded 472, in order to prevent any accidental shorting with the water. The circuit includes an AC power source 474 fuse 476, DC power source 498, fuse 500, power switch 476 and power on indicator light 484. Preferably the cover is fastened to the flowboard by electric interlock means 480, in addition to a mechanical lock, to prevent accidents should the cover 14 be opened while the electrical power to the unit is on, housing closed light 482 indicating the status of the interlock. The water flow to the system can be halted when contacts 488 of the high water level switch 36 are closed and cause solenoid valve 24 to close. The water can be dispensed when contacts 486 of the push button switch 41 are closed and cause solenoid valve 40 to open. Optionally the system can include an elapsed time meter and a night-light activated by a photocell. The ultraviolet lamp assembly 290 is connected to the circuit through fuse 492. Fan motor 502, thermoelectric means 504, discrete water quality measuring means 510, and indicator lamps 512, and an operational clock 514 or flow meter are also connected to the circuit. The circuit also includes contacts 506 for circulation pump 38 and associated pump operation indicating light 508. The circuit could also include pressure sensing means (not shown) to indicate any stoppage in the water flow. The circuit could further include a continuous conductivity meter and control to indicate concentration of dissolved solids and shut down the unit if these solids exceed a preset limit.

This embodiment includes reverse osmosis water purification suitable for both home and office. A larger embodiment might be suitable for public facilities, such as malls and shopping centers while special embodiments could be made portable and intended for travel and/or even camping or survival use. These latter embodiments would preferably be battery powered. Any of these embodiments could be provided with water temperature control means including either or both water-cooling and water heating means.

All home and office water embodiments preferably are of such dimensions as to fall into a counter top classification requiring little installation preparation. The illustrated embodiment, for example, would simply require attachment to a water supply, to a water drain, and electrical power. The unit could, if necessary, be installed in a cabinet or under a counter. However, it is preferable to keep the unit visible to the user since this would attract the user's curiosity to observe and monitor system operation. This will lead to frequent use of the system and the reliance on it as the primary means for water supply.

The water treatment applications considered and discussed should in no way be considered as a limitation on the scope of the present invention. The embodiment described is for purifying water with basic water conditioning and ion exchange utilizing some generically known components, such as the filters and ultraviolet disinfection module. For a basic water conditioning system, a low micron rating (10-micron) sediment filter cartridge, such as an organic adsorption cartridge consisting mainly of high capacity granular activated charcoal, can be used as a pretreatment filter. The charcoal could be silver impregnated to inhibit microbiological growth or blended with activated alumina or a weak acid cation for removing lead and other heavy metals from the water. An ion exchange cartridge, for example one containing a strong base anion resin selected for nitrate removal, preferably follows the charcoal adsorption cartridge. An ultraviolet disinfection element is the final water treatment. It should be noted that this is only a suggested arrangement of cartridges and is not mandated by the present invention. Other arrangements of the cartridges could be used, especially to accommodate for local water conditions. Also, as previously mentioned, cartridges could be provided to add corrective chemicals, or even dispense medications, to the water to arrive at the finally desired chemical composition. For example and as previously mentioned, fluoride could be added to or removed from the water. Should a natural occurrence, such as a hurricane, temporarily interrupt or affect the water supply, then appropriate cartridges could be added to the system to achieve the desired correction for a temporary situation.

An additional advantage of the present invention is its flexibility. The flowboard can be readily expanded to accommodate additional cartridges customizing the treatment process for a particular local water condition. The flowboard could be modified to allow for the addition of a thermoelectric water cooler and/or an electric hot water heater. The subject system can be provided with many options, such as, electric locks so that the housing cannot be opened unless the power is disconnected. Removal of the cover, to replace parts or cartridges, will de-energize all electrically operated flowboard mounted elements, such as the solenoid valves, the ultraviolet lamp, the fan and thermoelectric elements. The system can have various alarms and lights, such as a night-light, which comes on in response to darkness. A pump time switch, elapsed time clock and a flow monitor are other options.

The system preferably operates off 110v AC power, and direct current power for the thermoelectric element. However, this does not prevent producing a battery-powered embodiment.

It will be readily appreciated from the foregoing discussion that the present invention is readily adaptable for all types of water treatment. In addition to, or in place of, some or all of the filter cartridges, cartridges containing material, such as chlorine and/or fluoride, can be introduced to the system. Water flowing through these cartridges would dissolve the material contained therein at a controlled rate, thereby effectively adding it to the water being consumed.

The present invention may be subject to many modifications and changes without departing from the spirit or essential characteristics thereof. The above described embodiments should therefor be considered in all respects as being illustrative and not restrictive of the scope of the present invention as defined by the appended claims.

What is claimed is:

1. A method for treating and purifying water on site, including reverse osmosis, comprising:

providing a flowboard having a plurality of mounting blocks opening from a top surface thereof and flow means interconnecting said blocks within said flowboard;

providing a plurality of water treatment cartridges, each said cartridge being single ended, readily received in and removed from a respective mounting block, and adapted to treat a specific aspect of the water to be purified, at least one of said modules providing reverse osmosis water treatment, at least one cartridge capable of physically treating water by removing suspended and colloidal matter, and at least one cartridge capable of chemically treating the water by the removal of undesirable or all chemicals therefrom thereby improving the purity and taste of the water; and directing a flow of water sequentially through said cartridges where the water will be treated so as to remove any impurities therein.

2. A counter-top system, including reverse osmosis, for on site treatment of water to provide substantially pure water suitable for human consumption, said system comprising:

flowboard means defining a cavity containing a plurality of mounting blocks and conduit means interconnecting said blocks to form a closed path flow circuit, at least some of said mounting blocks opening on and accessible to an upper surface of said flowboard;

water inlet means and water drain means connected to said flow circuit;

purified water outlet means connected to said flow circuit;

a plurality of single port water treatment cartridges each containing materials suitable for the treatment of water for the purposes of purifying said water, each said cartridge received in a respective mounting block of said flowboard whereby water passing through said system is sequentially treated by passing into and out of the respective cartridges while being treated for removal of substantially all of the impurities contained therein, at least one of said cartridges incorporating reverse osmosis;

valve means mounted in said flowboard and connected in said flow path so as to control the direction of flow through said flowboard; and a purified water storage tank including means to dispense the purified water.

3. A system according to claim 2 wherein:

each said single port cartridge removes at least one form of contaminant from water passing into and out of said cartridge by passage of water therethrough either axially or coaxially.

4. The counter-top reverse osmosis water purification system according to claim 3 further comprising:

at least one cartridge having a spiral-wound cartridge insert.

5. The counter-top reverse osmosis water purification system according to claim 3 further comprising:

at least one cartridge having an cartridge containing an on-line replaceable single ended ultraviolet lamp contained within concentric sleeves allowing for water circulation and/or for lamp cooling with air.

6. The counter-top reverse osmosis water purification system according to claim 3 further comprising:

pump means received in a respective mounting block to be connected in said flow path to maintain sufficient pressure to circulate the purified water.

7. The counter-top reverse osmosis water purification system according to claim 3 further comprising:

solenoid valve means received in a respective mounting block to be connected in said flow path to control flow of water therethrough.

8. The counter-top reverse osmosis water purification system according to claim 3 further comprising:

needle valve means received in a respective mounting block to be connected into said flow path to control the flow of water therethrough.

9. The counter-top reverse osmosis water purification system according to claim 3 further comprising:

check valve means received in a respective mounting block to be connected into said flow path to control the flow of water therethrough.

10. The counter-top reverse osmosis water purification system according to claim 3 further comprising:

silver impregnated carbon vent disinfection bed received in a respective mounting block to be connected into said flow path so as to prevent the unwanted intake of untreated air into said system.

11. The counter-top reverse osmosis water purification system according to claim 3 further comprising:

vent/drain gap cup received in a respective one of said mounting blocks to be connected into said flow path.

12. A system according to claim 2 wherein:

at least one cartridge dispenses an additive into said water.

13. A system according to claim 2 wherein:

at least one of said cartridges exposes water-passing therethrough to radiation.

14. The counter-top reverse osmosis water purification system according to claim 3 further comprising:

means for interconnecting said flowboard with other like flowboards whereby the system can be expanded and the flow path modified.

15. An apparatus for the treatment of water as necessary for removal of substantially all of the impurities therefrom and/or the addition of taste/purity enhances thereto, said apparatus comprising:

a flowboard defining a cavity having therein a plurality of mounting blocks, conduit means connecting said mounting blocks to form a flow path extending from an inlet to an outlet, and valve means connected in said flow path controlling the direction of flow through said apparatus;

a plurality of single ended cartridges each removably received vertically in a respective one of said mounting blocks, each said cartridge containing therein means to treat water to either remove a specific impurity found in untreated water or to add a water purity/flavor enhancer, at least one of said cartridges incorporating reverse osmosis.

16. The apparatus according to claim 15 wherein at least one of said cartridges comprises:

an ultraviolet lamp encased within concentric spaced sleeves to define an annulus space between the two sleeves whereby cooling air is provided to the lamp.

17. The apparatus according to claim 16 further comprising:

means providing forced convection air draft around said lamp.

18. The apparatus according to claim 15 wherein said valve means comprises:

at least one linear motion valve which, by means of linear movement, opens, isolates or bypasses multiple connections simultaneously thereby controlling direction of flow through the system.

19. The apparatus according to claim 15 wherein the normal flow pattern through each individual cartridge containing particulate filter material is downward through the material to thereby maintain said particles in a packed condition to insure uniform flow therethrough.

20. The apparatus according to claim 15 further comprising:

a thermoelectric water cooler and/or an electric water heater.

21. The apparatus according to claim 15 further comprising:

cover means enclosing said cartridges and secured to said flowboard.

22. The apparatus according to claim 15 further comprising:

electric lock means activated by removal of the cover to de-energize all electrically operated flow board mounted elements.

23. The apparatus according to claim 15 further comprising:

system status indication means including alarms and lights to give a visual indication of the proper operation of said apparatus.

24. The apparatus according to claim 15 further comprising:

lapsed time clock means for monitoring the time interval between servicing of said cartridges; and flow monitor means measuring the volume of water passing through said apparatus.

25. The apparatus according to claim 15 wherein:

said system preferably operates off 110v AC power with direct current power for the thermoelectric element.

26. The apparatus according to claim 15 further comprising:

at least one cartridge add water treating/conditioning material into the water in said flow path.

27. An improved apparatus for the on-site treatment of water in accordance with claim 15 wherein at least some of said mounting blocks comprise:

a housing having a cylindrical receiving socket blind bore with a cylindrical sleeve fixed coaxially therein to define an inner axial chamber and an outer annular chamber coaxial around said axial chamber, a first port providing fluid communication only with said inner chamber and a second port providing communication with only said annular chamber whereby water can be inserted axially into an associated water treatment cartridge and retrieved annularly from said cartridge or vice versa.

28. The apparatus according to claim 15 wherein at least some of said mounting blocks further comprise:

means for detachably receiving a respective water treatment cartridge by one end vertically therein.

29. The apparatus according to claim 15 wherein said valve means comprises;

at least one linear valve having an elongated housing with an axial bore therein, an elongated valve member extending the length of said bore, means to move said valve member axially along said bore, a plurality of ports intersecting said bore at spaced locations, and valve means secured on said valve member disposed so that movement of said valve member along said bore allow and/or prevents fluid communication between various of said ports.

30. The apparatus according to claim 15 wherein said reverse osmosis cartridge comprises:

at least one spiral wound reverse osmosis membrane housed within a single ended cartridge having a single port containing concentric water inlet, reject water outlet and permeate water outlet.

31. The apparatus according to claim 15 wherein purified water is stored against atmospheric pressure without back pressure and the high differential pressure between the supply header and the storage tank enhances membrane capacity thereby allowing use of a more compact and esthetically acceptable counter top storage vessel, the vessel is provided with a spill proof insert received in the neck of the vessel and engages the inner annular elements of the three-way mounting block, said insert consists of an outer sleeve force fitted into the neck of the water storage vessel and a coaxial outer sleeve which contains an array of slots to allow water to flow from vessel housing downwardly through the annular space of the mounting block, the upper end of the outer sleeve is threaded to engage a threaded shank which supports a purified water feed tube, an overflow tube runs coaxially inside the water feed tube and extends further out to allow for air intake and exhale due to water level fluctuation in the water storage vessel.

32. The apparatus according to claim 15 wherein water treatment cartridges and the storage tank are single ended devices mounted vertically on said flowboard which conceals all connecting piping and fittings.

33. The apparatus according to claim 15 wherein all water treatment modules and flow control devices are provided with only one single threaded connection so that they can be placed on and removed from the flowboard by hand.

34. The apparatus according to claim 15 wherein said valve means are linear valves for controlling purging, recycling, and draining operations of said apparatus with a single motion of each linear valve.

35. The apparatus according to claim 15 wherein:

all electrical wiring is concealed and all electrically operated devices have concentric electrical contact strips of opposite polarity at the top of each of these devices, said contact strips engaging spring-tensioned contacts of equivalent size, aligned above each device and mounted within a protective socket integral to the system housing forming, further comprising interlock means whereby opening the system housing requires that the power cord to the unit be unplugged in order to deactivate the system electrical locks and removing the cover causes all power-supplied fixtures attached to said cover to be momentarily isolated from their associated flow devices mounted on the flowboard, rendering these devices safe for inspection and maintenance.

36. The apparatus according to claim 15 further comprising:

pump means having a drive housing and a pump casing to encapsulate an impeller and its magnet, a vertical wall of said pump housing having series of holes for fluid discharge through a conduit extended through the bottom of the pump casing to a single ended concentric threaded outlet which can be easily engage the thread of a mounting block.

37. The apparatus according to claim 36 wherein said pump means is a single stage pump.

38. The apparatus according to claim 36 wherein said pump is a multi-stage pump to produce higher discharge pressure.

39. The apparatus according to claim 15 further comprising a single ended, top mounted solenoid valve comprising:

a two-part housing defining an upper coil housing to encapsulate a wire coil to be completely isolated from the fluid, and, at the top of said upper part, two concentric electrical contact strips placed on an insulated padding and connected internally to the solenoid coil and externally to a power supply; and a lower plunger chamber:

a wire coil in the form of a cylinder having a length much greater than its diameter;

a cylindrical iron plunger coated with material to prevent rust formation and mounted for free movement in a vertical plane through a plunger chamber of said housing, the plunger having a rim close to its lower end to prevent the plunger from dropping through the solenoid valve mounting assembly;

wherein passage of direct electric current through a uniformly wound coil of wire creates a magnetic field that draws said plunger into the solenoid.

40. The apparatus according to claim 15 further comprising:

a single ended, vertically mounted check valve which allows water to flow only in one direction, said check valve comprises valve body profiled to engage a mounting block and support a short spring loaded plunger that has slightly tapered tip to easily engage the mounting block internal cylindrical element, it also has a sealing element placed in a groove to maintain proper sealing with the element which serves as a seat for the plunger.

41. The apparatus according to claim 15 further comprising a flowboard mounted high level switch requiring only one point for sensing a flow condition.

42. The apparatus according to claim 15 further comprising a single ended vent disinfection silver impregnated charcoal cartridge consisting of a housing which contains activated charcoal impregnated with silver placed within a filament sac to inhibit entrance of airborne microbes that could possibly enter the system and grow during storage tank filing and emptying, a vent tube connected at its core is secured at the top of the housing to allow for air or water movement across the media.

43. The apparatus according to claim 15 further comprising a single ended vent/drain gap cup comprising a small cup open top having a short cylinder wall with a threaded connection for mounting on a block to maintain a physical gap between the drainage and the sewer system, and the vent system of stored water vessel to prevent microbial contamination, in case of back flow of the drain system for any unforeseen reason, in which case, backed up drain water overflows the cup and does not penetrate the storage vessel.

44. The apparatus according to claim 15 further comprising:

a high level switch controlling the water level in said storage tank.

45. The apparatus according to claim 15 wherein the flow path through the system in the normal service mode is downward through the ion exchange and carbon beds for higher efficiency.

46. The apparatus according to claim 15 wherein:

said storage tank is located intermediate in the flow path; and further comprising:

mixed bed ion exchange means; and temperature controlled disinfection means both located down stream of the storage tank to insure the removal of any dissolved gases that could occur during storage.

47. The apparatus according to claim 15 further comprising:

single ended, top mounted pump means connected to overcome pressure drop across the ion exchange bed.

* * * * *